(12) United States Patent
Cho et al.

(10) Patent No.: US 10,541,728 B2
(45) Date of Patent: *Jan. 21, 2020

(54) NEAR FIELD COMMUNICATION DEVICES, SYSTEMS, AND METHODS USING Q FACTOR ADJUSTMENTS

(71) Applicant: Samsung Electronics Co., Ltd., Suwon-si, Gyeonggi-do (KR)

(72) Inventors: Jong-Pil Cho, Hwaseong-si (KR); Il-Jong Song, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/202,236

(22) Filed: Nov. 28, 2018

(65) Prior Publication Data

US 2019/0097684 A1 Mar. 28, 2019

Related U.S. Application Data

(63) Continuation of application No. 15/445,028, filed on Feb. 28, 2017, now Pat. No. 10,148,319, which is a
(Continued)

(30) Foreign Application Priority Data

Mar. 7, 2013 (KR) ........................ 10-2013-0024614

(51) Int. Cl.
*H04B 5/00* (2006.01)
*H01Q 1/22* (2006.01)
(Continued)

(52) U.S. Cl.
CPC ....... *H04B 5/0031* (2013.01); *G06K 7/10148* (2013.01); *G06K 7/10237* (2013.01);
(Continued)

(58) Field of Classification Search
CPC ...... H04B 5/0031; H04B 5/00; H04B 5/0056; G06K 7/10148; G06K 7/10237; G06K 19/0726; H01Q 1/2225
(Continued)

(56) References Cited

U.S. PATENT DOCUMENTS

| | | | |
|---|---|---|---|
| 5,874,725 A | 2/1999 | Yamaguchi | |
| 6,812,745 B1 | 11/2004 | Wu | ........................ H02M 3/073 326/112 |
| 9,596,003 B2 * | 3/2017 | Cho | ........................ H04B 5/00 |
| 2004/0134985 A1 | 7/2004 | Deguchi | |

(Continued)

FOREIGN PATENT DOCUMENTS

| | | |
|---|---|---|
| JP | 002-334310 | 11/2002 |
| JP | 2005-173862 | 6/2005 |

(Continued)

*Primary Examiner* — Eugene Yun
(74) *Attorney, Agent, or Firm* — Sughrue Mion, PLLC

(57) ABSTRACT

An NFC (near field communication) device can include a resonance unit and an NFC chip. The resonance unit may communicate with an external device through an electromagnetic wave. The NFC chip can provide output data to the resonance unit, receive input data from the resonance unit, and can reduce a Q factor (quality factor) of the resonance unit when a signal receive operation is performed in a card mode, and can maintain the Q factor of the resonance unit in a reader mode and when a signal transmit operation is performed in the card mode.

20 Claims, 22 Drawing Sheets

Related U.S. Application Data continuation of application No. 14/199,346, filed on Mar. 6, 2014, now Pat. No. 9,596,003.

(51) Int. Cl.
 *G06K 7/10* (2006.01)
 *G06K 19/07* (2006.01)

(52) U.S. Cl.
 CPC ....... G06K 19/0726 (2013.01); H01Q 1/2225 (2013.01); H04B 5/00 (2013.01); H04B 5/0056 (2013.01)

(58) Field of Classification Search
 USPC ........................................................ 455/41.1
 See application file for complete search history.

(56) References Cited

U.S. PATENT DOCUMENTS

| | | |
|---|---|---|
| 2008/0012712 A1 | 1/2008 | Shimizu |
| 2008/0084277 A1 | 4/2008 | Korekoda |
| 2010/0136911 A1 | 6/2010 | Sekita et al. |
| 2010/0328045 A1 | 12/2010 | Goto et al. |
| 2013/0321230 A1 | 12/2013 | Merlin ................. H01Q 1/2225 343/787 |

FOREIGN PATENT DOCUMENTS

| | | |
|---|---|---|
| JP | 2010-238166 | 10/2010 |
| JP | 2011-097389 | 5/2011 |
| JP | 2011-182159 | 9/2011 |

\* cited by examiner

NEAR FIELD COMMUNICATION DEVICES, SYSTEMS, AND METHODS USING Q FACTOR ADJUSTMENTS

CROSS-REFERENCE TO RELATED APPLICATIONS

This application is a continuation of U.S. patent application Ser. No. 15/445,028, filed Feb. 28, 2017 in the U.S. Patent and Trademark Office, allowed, which is a continuation of U.S. patent application Ser. No. 14/199,346, filed Mar. 6, 2014 in the U.S. Patent and Trademark Office, now U.S. Pat. No. 9,596,003, which claims priority under 35 USC § 119 to Korean Patent Application No. 10-2013-0024614, filed Mar. 7, 2013 in the Korean Intellectual Property Office (KIPO), the contents of each of which are hereby incorporated herein by reference in their entireties.

FIELD

The invention relates to wireless communication technology, and more particularly to near field communication (NFC) devices.

BACKGROUND

NFC devices are extensively employed in mobile devices. As the mobile device is miniaturized, an antenna included in the NFC device may also be miniaturized. If the antenna included in the NFC device is miniaturized, the bandwidth may be reduced so that errors may occur during high-speed data communication.

SUMMARY

According to example embodiments, an NFC (near field communication) device includes a resonance unit and an NFC chip. The resonance unit makes data communication with an external device through an electromagnetic wave. The NFC chip provides output data to the resonance unit, receives input data from the resonance unit, reduces a Q factor (quality factor) of the resonance unit when a signal receive operation is performed in a card mode, and maintains the Q factor of the resonance unit in a reader mode and when a signal transmit operation is performed in the card mode.

In example embodiments, the NFC chip may connect a terminal connected to the resonance unit to a ground voltage through a pull-down load when the signal receive operation is performed in the card mode and cut off the terminal connected to the resonance unit from the ground voltage in the reader mode and when the signal transmit operation is performed in the card mode.

In example embodiments, the NFC chip may measure a voltage supplied from the resonance unit and control a reduction degree of the Q factor of the resonance unit based on a magnitude of the measured voltage when the signal receive operation is performed in the card mode.

According to example embodiments, an NFC (near field communication) device includes a resonance unit, a rectifier, a regulator and a Q (quality) sink unit. The resonance unit generates a first voltage in response to an electromagnetic wave. The rectifier generates a second voltage by rectifying the first voltage. The regulator generates an internal voltage having a voltage level of a constant magnitude by using the second voltage to output the internal voltage to a first node. The Q (quality) sink unit may be connected between the first node and a ground voltage, turn on to reduce a Q factor (quality factor) of the resonance unit when a signal receive operation is performed in a card mode, and turn off to maintain the Q factor in a reader mode and when a signal transmit operation is performed in the card mode.

In example embodiments, the Q sink unit may include a Q sink controller configured to generate a Q sink signal enabled when the signal receive operation is performed in the card mode and disabled in the reader mode and when the signal transmit operation is performed in the card mode, and a pull-down unit configured to connect the first node to the ground voltage through a pull-down load when the Q sink signal is enabled and to cut off the first node from the ground voltage when the Q sink signal is disabled.

The NFC device may further include a central processing unit (CPU) configured to generate a mode signal that represents the card mode or the reader mode and the signal receive operation or the signal transmit operation when the mode is the card mode, wherein the Q sink controller generates the Q sink signal based on the mode signal.

The pull-down unit may include a switch connected to the first node and turned on in response to the Q sink signal, and a current source connected between the switch and the ground voltage to generate a current having a constant magnitude.

The pull-down unit may include a slew control unit configured to generate first to $n^{th}$ Q sink sub-signals, which are sequentially enabled at a first time interval, when the Q sink signal is enabled and to generate first to $n^{th}$ Q sink sub-signals, which are sequentially disabled at the first time interval, when the Q sink signal is disabled, first to $n^{th}$ switches connected to the first node and turned on in response to the first to $n^{th}$ Q sink sub-signals, respectively, and first to $n^{th}$ current sources connected between the first to $n^{th}$ switches and the ground voltage, respectively, to generate a current having a constant magnitude.

The pull-down unit may include a switch connected to the first node and turned on in response to the Q sink signal, and a resistor connected between the switch and the ground voltage.

The pull-down unit may include a slew control unit configured to generate first to $n^{th}$ Q sink sub-signals, which are sequentially enabled at a first time interval, when the Q sink signal is enabled and to generate first to nth Q sink sub-signals, which are sequentially disabled at the first time interval, when the Q sink signal is disabled, first to $n^{th}$ switches connected to the first node and turned on in response to the first to $n^{th}$ Q sink sub-signals, respectively, and first to $n^{th}$ resistors connected between the first to $n^{th}$ switches and the ground voltage, respectively.

In example embodiments, the NFC device may further include a field detector configured to receive the first voltage to generate a field intensity signal corresponding to a magnitude of the first voltage, wherein the Q sink unit controls a reduction degree of the Q factor of the resonance unit based on the field intensity signal when the signal receive operation is performed in the card mode.

The Q sink unit may include a Q sink controller configured to generate a Q sink signal enabled when the signal receive operation is performed in the card mode and disabled in the reader mode and when the signal transmit operation is performed in the card mode and to generate a Q factor tuning signal based on the field intensity signal, and a pull-down unit configured to connect the first node to the ground voltage through a pull-down load having a magnitude corresponding to the Q factor tuning signal when the Q sink signal is enabled and to cut off the first node from the ground voltage when the Q sink signal is disabled.

The pull-down unit may include a switch connected to the first node and turned on in response to the Q sink signal, and a variable current source connected between the switch and the ground voltage to generate a current having a magnitude corresponding to the Q factor tuning signal.

The pull-down unit may include a slew control unit configured to generate first to $n^{th}$ Q sink sub-signals, which are sequentially enabled at a first time interval, when the Q sink signal is enabled and to generate first to $n^{th}$ Q sink sub-signals, which are sequentially disabled at the first time interval, when the Q sink signal is disabled, first to $n^{th}$ switches connected to the first node and turned on in response to the first to $n^{th}$ Q sink sub-signals, respectively, and first to nth variable current sources connected between the first to $n^{th}$ switches and the ground voltage, respectively, to generate a current having a magnitude corresponding to the Q factor tuning signal.

The pull-down unit may include a switch connected to the first node and turned on in response to the Q sink signal, and a variable resistor connected between the switch and the ground voltage and having a resistance with a magnitude corresponding to the Q factor tuning signal.

The pull-down unit may include a slew control unit configured to generate first to $n^{th}$ Q sink sub-signals, which are sequentially enabled at a first time interval, when the Q sink signal is enabled and to generate first to $n^{th}$ Q sink sub-signals, which are sequentially disabled at the first time interval, when the Q sink signal is disabled, first to $n^{th}$ switches connected to the first node and turned on in response to the first to $n^{th}$ Q sink sub-signals, respectively, and first to $n^{th}$ variable resistors connected between the first to $n^{th}$ switches and the ground voltage, respectively, and having a resistance with a magnitude corresponding to the Q factor tuning signal.

According to example embodiments, an NFC (near field communication) device includes a resonance unit and a transmit unit. The resonance unit generates an electromagnetic wave corresponding to a transmit signal received from a transmit terminal in a reader mode. The transmit unit generates the transmit signal corresponding to output data to provide the transmit data to the transmit terminal in the reader mode, reduces a Q factor (quality factor) of the resonance unit when a signal receive operation is performed in a card mode, and maintains the Q factor when a signal transmit operation is performed in the card mode.

In example embodiments, the transmit unit may connect the transmit terminal to a supply voltage through a pull-up load or connect the transmit terminal to a ground voltage through a pull-down load based on the output data in the reader mode, connect the transmit terminal to the ground voltage through the pull-down load when the signal receive operation is performed in the card mode, and cut off the transmit terminal from the ground voltage and the supply voltage when the signal transmit operation is performed in the card mode.

In example embodiments, the transmit unit may include a pull-up transistor connected between the supply voltage and the transmit terminal, a pull-down transistor connected between the ground voltage and the transmit terminal, and a driving unit configured to selectively turn on one of the pull-up transistor and the pull-down transistor based on the output data in the reader mode, to turn off the pull-up transistor while turning on the pull-down transistor when the signal receive operation is performed in the card mode, and to turn off the pull-up transistor and the pull-down transistor when the signal transmit operation is performed in the card mode.

The NFC device may further include a central processing unit (CPU) configured to generate a mode signal that represents the card mode or the reader mode and the signal receive operation or the signal transmit operation when the mode is the card mode, wherein the driving unit drives the pull-up transistor and the pull-down transistor based on the mode signal.

In example embodiments, the transmit unit may include first to $n^{th}$ pull-up transistors connected in parallel between the supply voltage and the transmit terminal, first to $n^{th}$ pull-down transistors connected in parallel between the ground voltage and the transmit terminal, and a driving unit configured to turn on the first to $n^{th}$ pull-up transistors or the first to $n^{th}$ pull-down transistors based on the output data in the reader mode, to turn off the first to $n^{th}$ pull-up transistors while sequentially turning on the first to $n^{th}$ pull-down transistors at a first time interval when the signal receive operation is performed in the card mode, and to turn off the first to $n^{th}$ pull-up transistors while sequentially turning off the first to $n^{th}$ pull-down transistors at the first time interval when the signal transmit operation is performed in the card mode.

In example embodiments, the NFC device may further include a field detector configured to measure a voltage supplied from the resonance unit to generate a field intensity signal corresponding to a magnitude of the measured voltage in the card mode, wherein the transmit unit controls a reduction degree of the Q factor of the resonance unit based on the field intensity signal when the signal receive operation is performed in the card mode.

The transmit unit may include first to $n^{th}$ pull-up transistors connected in parallel between the supply voltage and the transmit terminal, first to $n^{th}$ pull-down transistors connected in parallel between the ground voltage and the transmit terminal, and a driving unit configured to turn on the first to $n^{th}$ pull-up transistors or the first to $n^{th}$ pull-down transistors based on the output data in the reader mode, to select k pull-down transistors (k is a positive integer equal to or less than n) among the first to $n^{th}$ pull-down transistors based on the field intensity signal in the card mode, to turn off the first to $n^{th}$ pull-up transistors and (n-k) pull-down transistors, which are not selected, while sequentially turning on the k pull-down transistors at a first time interval when the signal receive operation is performed in the card mode, and to turn off the first to $n^{th}$ pull-up transistors and (n-k) pull-down transistors, which are not selected, while sequentially turning off the k pull-down transistors at the first time interval when the signal transmit operation is performed in the card mode.

According to example embodiments, an electronic system includes an NFC (near field communication) device, a memory device and an application processor. The NFC device makes communication with an external device through an NFC. The memory device stores output data and input data. The application processor controls operations of the NFC device and the memory device. The NFC device includes a resonance unit configured to transmit the output data to the external device through an electromagnetic wave, and an NFC chip configured to provide the output data to the resonance unit, to receive the input data from the resonance unit, to reduce a Q factor (quality factor) of the resonance unit when a signal receive operation is performed in a card mode, and to maintain the Q factor of the resonance unit in a reader mode and when a signal transmit operation is performed in the card mode.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
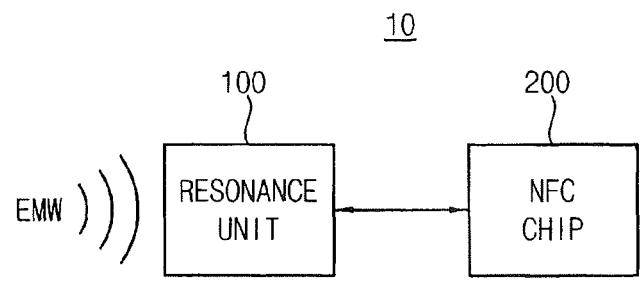
FIG. 1 is a block diagram illustrating an NFC (near field communication) device according to an example embodiment.

Various example embodiments will be described more fully with reference to the accompanying drawings, in which some example embodiments are shown. The present inventive concept may, however, be embodied in many different forms and should not be construed as limited to the embodiments set forth herein. Rather, these embodiments are provided so that this disclosure will be thorough and complete, and will fully convey the scope of the present inventive concept to those skilled in the art. Like reference numerals refer to like elements throughout this application.

It will be understood that, although the teams first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an NFC (near field communication) device according to an example embodiment.

The NFC device 10 illustrated in FIG. 1 makes communication with an external device through an NFC scheme. The NFC device 10 makes data communication with an external reader based on an electromagnetic wave (EMW) supplied from the external reader in a card mode, where the NFC device 10 serves as a card and makes data communication with an external card based on the EMW generated from the NFC device 10 in a reader mode where the NFC device 10 serves as a reader.

Referring to FIG. 1, the NFC device 10 includes a resonance unit 100 and an NFC chip 200.

Upon the signal receive operation, the resonance unit 100 receives input data from the external device through the EMW and the NFC chip 200 receives the input data from the resonance unit 100. Upon the signal transmit operation, the NFC chip 200 provides output data to the resonance unit 100 and the resonance unit 100 transmits the output data to the external device through the EMW.

The resonance unit 100 may include a resonance circuit including an antenna having an inductance component and a resonance capacitor.

In the card mode, the resonance unit 100 provides a signal, which is induced in response to the EMW received from the external device, to the NFC chip 200 and the NFC chip 200 performs the signal receive operation by generating the input data by demodulating the signal. In the card mode for a signal transmit operation, the NFC chip 200 provides a modulation signal, which is generated by modulating the output data, to the resonance unit 100 and the resonance unit 100 may perform the signal transmit operation by reflecting the EMW received from the external device based on the modulation signal.

In the reader mode, the NFC chip 200 can provide a transmit signal as part of a signal transmit operation, which is obtained by synthesizing the modulation signal generated by modulating the output data with a carrier signal, to the resonance unit 100 and the resonance unit 100 provides the transmit signal in the faun of the EMW to the external device to perform the signal transmit operation. In the reader mode, the NFC chip 200 can provide a signal as part of a signal receive operation, which is induced in response to the EMW reflected from the external device, and the NFC chip 200 generates the input data by demodulating the signal to perform the signal receive operation.

The NFC chip 200 reduces the Q factor (quality factor) of the resonance unit 100 when the signal receive operation is performed in the card mode and maintains the Q factor in the reader mode and when the signal transmit operation is performed in the card mode.

For instance, the NFC chip 200 may reduce the Q factor of the resonance unit 100 when the signal receive operation is performed in the card mode by connecting a terminal connected to the resonance unit 100 to a ground voltage GND through a pull-down load. In addition, the NFC chip 200 may maintain the Q factor in the reader mode and when the signal transmit operation is performed in the card mode by cutting off the terminal connected to the resonance unit 100 from the ground voltage GND.

Figure 2:
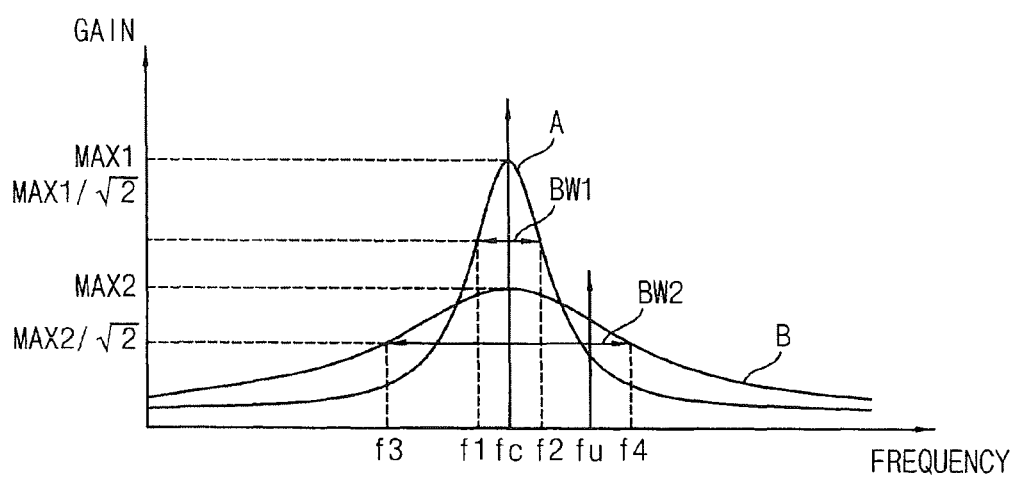
FIG. 2 is a graph to explain the operation of the NFC device of FIG. 1.

FIG. 2 is a graph to explain the operation of the NFC device of FIG. 1.

In FIG. 2, a first graph A represents the frequency characteristic of the resonance unit 100.

Referring to FIG. 2, the resonance unit 100 may have the longitudinal frequency characteristic having the center on the carrier frequency fc. The resonance unit 100 may have the maximum gain MAX1 at the carrier frequency fc and may have a first bandwidth BW1 where a first frequency f1 and a second frequency f2 serve as cutoff frequencies. The Q factor of the resonance unit 100 may have a value obtained by dividing the carrier frequency fc by the first bandwidth BW1.

Since the NFC chip 200 maintains the Q factor of the resonance unit 100 in the reader mode and when the signal transmit operation is performed in the card mode, the resonance unit 100 may have the frequency characteristic as shown in the first graph A in the reader mode and when the signal transmit operation is performed in the card mode.

As appreciated by the present inventors, if the frequency characteristic of the resonance unit 100 is not changed when the signal receive operation is performed in the card mode, as shown in FIG. 2, a high-speed signal having the high frequency fu equal to or higher than the second frequency f2 (for instance, the high frequency of 848 Kbps or more) is filtered by the resonance unit 100, so the NFC chip 200 may not normally demodulate the input data provided from the external device. Thus, the NFC device 100 may not perform the high-speed communication.

The bandwidth BW1 of the resonance unit 100 is reduced as the size of the antenna included in the resonance unit 100 becomes reduced and the intensity of the EMW received from the external device becomes weak, so the available communication speed of the NFC device 10 may be further limited.

However, as described above, the NFC chip 200 included in the NFC device 10 can reduce the Q factor of the resonance unit 100 when the signal receive operation is performed in the card mode. For instance, the NFC chip 200 reduces the gain of the resonance unit 100 by connecting the terminal connected to the resonance unit 100 to the ground voltage GND through the pull-down load when the signal receive operation is performed in the card mode, so the resonance unit 100 may have the frequency characteristic as shown in a second graph B of FIG. 2. At this time, the resonance unit 100 may have the maximum gain MAX2 at the carrier frequency fc and may have a second bandwidth BW2 where a third frequency f3 and a fourth frequency f4 serve as cutoff frequencies. Since the Q factor of the resonance unit 100 may have a value obtained by dividing the carrier frequency fc by the second bandwidth BW2, the Q factor of the resonance unit 100 is reduced.

In this case, as shown in FIG. 2, even when the resonance unit 100 receives the high-speed signal having the high frequency fu equal to or higher than the second frequency f2 (for instance, the high frequency of 848 Kbps or more), the high-speed signal can be normally received without being filtered. Thus, the available communication speed of the NFC device 10 may be increased.

Meanwhile, since the load modulation characteristic is lowered as the gain of the resonance unit 100 is reduced in the signal transmit operation, as described above, the NFC chip 200 cuts off the terminal connected to the resonance unit 100 from the ground voltage GND when the signal transmit operation is performed, so that the Q factor of the resonance unit 100 can be maintained In one example embodiment, the NFC chip 200 may measure a voltage supplied from the resonance unit 100 through the terminal connected to the resonance unit 100 when the signal receive operation is performed in the card mode in order to control the reduction degree of the Q factor of the resonance unit 100 based on the magnitude of the measured voltage. For instance, if the voltage supplied from the resonance unit 100 has a relatively great magnitude (that is, when operated in a near field), the Q factor of the resonance unit 100 is relatively small. In addition, if the voltage supplied from the resonance unit 100 has a relatively small magnitude (that is, when operated in a far field), the Q factor of the resonance unit 100 is relatively great. Therefore, the NFC chip 200 may increase the reduction degree of the Q factor of the resonance unit 100 as the voltage supplied from the resonance unit 100 is small when the signal receive operation is performed in the card mode.

Figure 3:
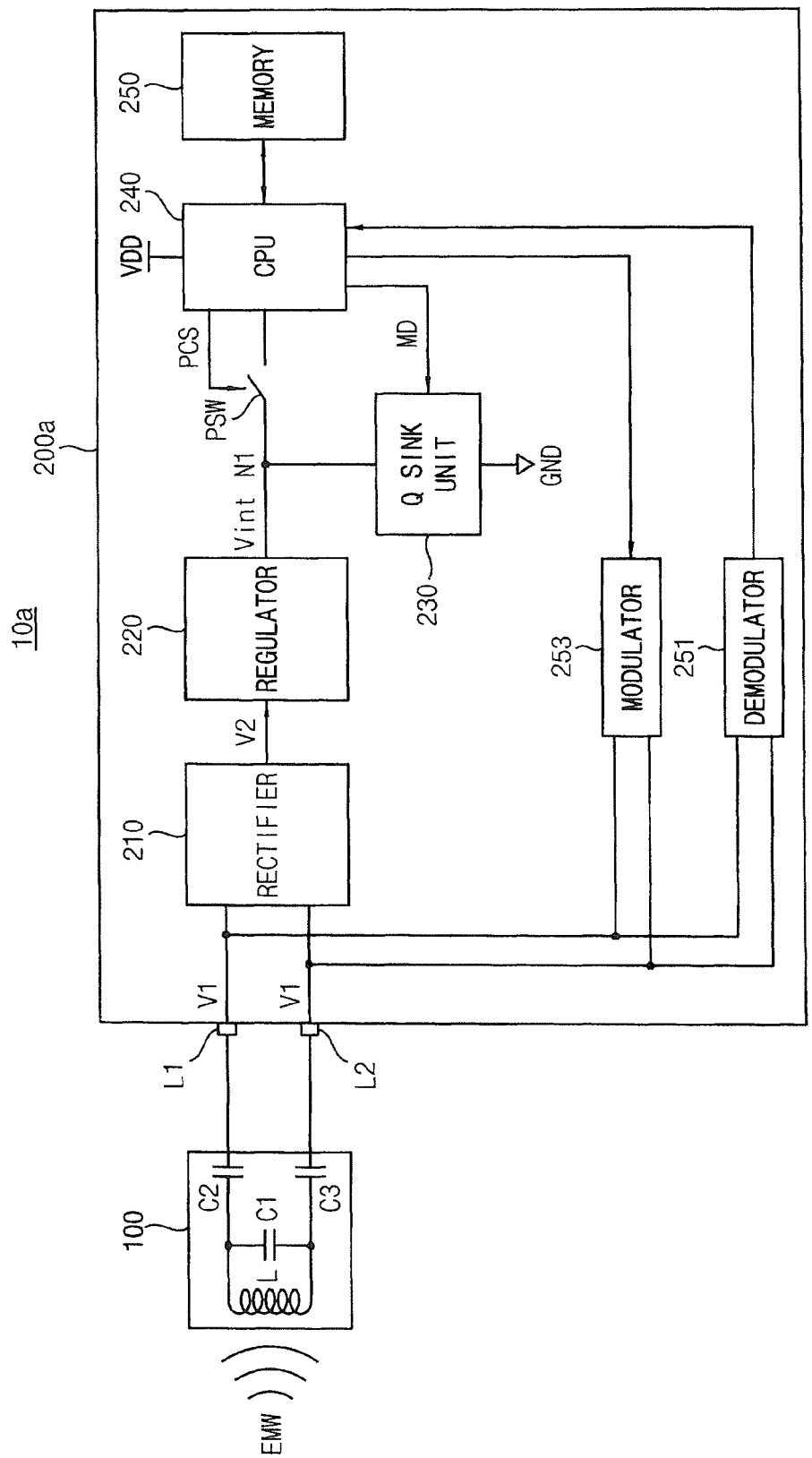
FIG. 3 is a block diagram illustrating an example of the NFC device of FIG. 1.

FIG. 3 is a block diagram illustrating an example of the NFC device of FIG. 1.

Only elements to operate the NFC device 10a in the card mode are illustrated in FIG. 3 and elements to operate the NFC device 10a in the reader mode are omitted in FIG. 3

Referring to FIG. 3, the NFC device 10a may include a resonance unit 100 and an NFC chip 200a.

The NFC chip 200a may be connected to the resonance unit 100 through a first power terminal L1 and a second power terminal L2.

The resonance unit 100 may include a resonance circuit having an antenna L and a first capacitor C1 and a filter having a second capacitor C2 to provide an induction voltage induced in response to the EMW to the first power terminal L1 and the second power terminal L2 and a third capacitor C3. The resonance unit 100 may supply the induction voltage induced in response to the EMW to the NFC chip 200a as a first voltage V1 through the filter.

The configuration of the resonance unit 100 illustrated in FIG. 3 is an example only and the configuration of the resonance unit 100 according to example embodiments may not be limited to the above, but may be variously modified.

The NFC chip 200a may receive the first voltage V1 from the resonance unit 100 through the first power terminal L1 and the second power terminal L2.

The NFC chip 200a may include a rectifier 210, a regulator 220, a Q sink unit 230, a central processing unit (CPU) 240, a power switch PSW, a memory 250, a demodulator 251 and a modulator 253.

The rectifier 210 can generate a second voltage V2 by rectifying the first voltage V1.

The regulator 220 can generate an internal voltage Vint having a voltage level of a predetermined magnitude usable in the NFC chip 200a by using the second voltage V2 and can provide the internal voltage Vint to a first node N1.

The CPU 240 can control the overall operation of the NFC chip 200a. The CPU 240 may operate by receiving a supply voltage VDD from a power source, such as a battery. In addition, the CPU 240 may receive the internal voltage Vint through the power switch PSW. When the supply voltage VDD has a predetermined level or more, the CPU 240 may operate by using the supply voltage VDD and disable a power control signal PCS to turn off the power switch PSW. Meanwhile, when the supply voltage VDD has a level less than the predetermined level, the CPU 240 enables the power control signal PCS to turn on the power switch PSW such that the CPU 240 can be operated by using the internal voltage Vint supplied from the regulator 220.

When the signal receive operation is performed in the card mode, the demodulator 251 generates the input data by demodulating the signal supplied from the resonance unit 100 through the first and second power terminals L1 and L2 to provide the input data to the CPU 240. The CPU 240 may store the input data in the memory 250.

When the signal transmit operation is performed in the card mode, the CPU 240 reads out the output data from the memory 250 to provide the output data to the modulator 253 and the modulator 253 may modulate the output data to provide a modulation signal to the first and second power terminals L1 and L2. For instance, the modulator 253 can generate the modulation signal by performing load modulation with respect to the output data.

The Q sink unit 230 may be connected between the first node N1 and the ground voltage GND. The Q sink unit 230 is turned on when the signal receive operation is performed in the card mode to reduce the Q factor of the resonance unit 100 and turned off in the reader mode and when the signal transmit operation is performed in the card mode to maintain the Q factor of the resonance unit 100.

In one example embodiment, the CPU 240 provides a mode signal MD, which represents the card mode or the reader mode and the signal receive operation or the signal transmit operation, to the Q sink unit 230, whereupon the Q sink unit 230 may selectively reduce the Q factor of the resonance unit 100 based on the mode signal MD.

Figure 4:
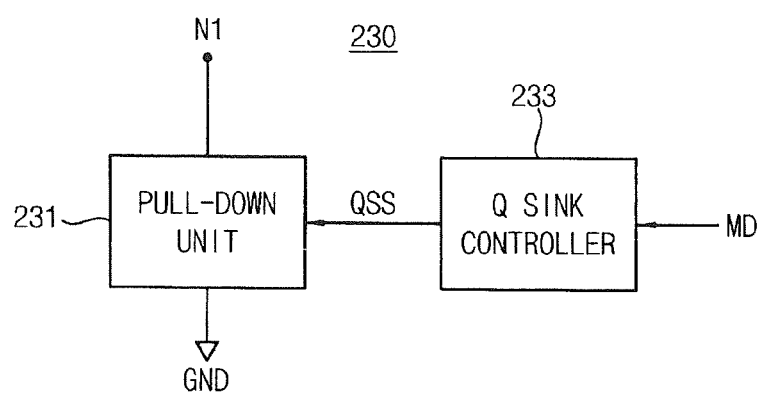
FIG. 4 is a block diagram illustrating an example of a Q sink unit included in the NFC device of FIG. 3.

FIG. 4 is a block diagram illustrating an example of the Q sink unit included in the NFC device of FIG. 3.

Referring to FIG. 4, the Q sink unit 230 may include a pull-down unit 231 and a Q sink controller 233.

The Q sink controller 233 may generate a Q sink signal QSS which is enabled when the signal receive operation is performed in the card mode and is disabled in the reader mode and when the signal transmit operation is performed in the card mode. For instance, the Q sink controller 233 may generate the Q sink signal QSS based on the mode signal MD received from the CPU 240.

The pull-down unit 231 may connect the first node N1 to the ground voltage GND through the pull-down load when the Q sink signal QSS is enabled and cut off the first node N1 from the ground voltage GND when the Q sink signal QSS is disabled.

Figure 5:
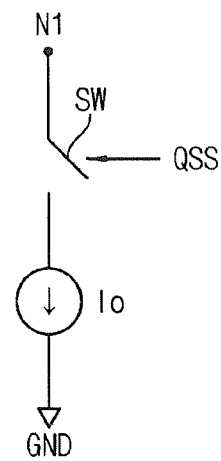
FIG. 5 is a diagram illustrating an example of a pull-down unit included in the Q sink unit of FIG. 4.

FIG. 5 is a diagram illustrating an example of the pull-down unit included in the Q sink unit of FIG. 4.

Referring to FIG. 5, the pull-down unit 231a may include a switch SW and a current source Io.

The switch SW may be connected between the first node N1 and the current source Io and the current source Io may be connected between the switch SW and the ground voltage GND. Otherwise, the current source Io may be connected between the first node N1 and the switch SW and the switch SW may be connected between the current source Io and the ground voltage GND.

The switch SW may be turned on when the Q sink signal QSS is enabled and turned off when the Q sink signal QSS is disabled.

The current source Io may generate a current having a constant magnitude.

As illustrated in FIG. 5, the pull-down unit 231a may selectively reduce the Q factor of the resonance unit 100 by connecting a current load between the first node N1 and the ground voltage GND based on the Q sink signal QSS.

Figure 6:
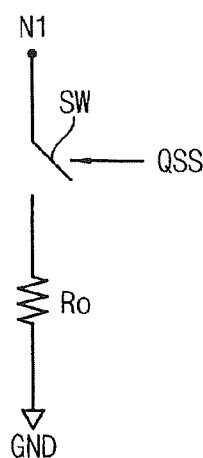
FIG. 6 is a diagram illustrating an example of a pull-down unit included in the Q sink unit of FIG. 4.

FIG. 6 is a diagram illustrating another example of the pull-down unit included in the Q sink unit of FIG. 4.

Referring to FIG. 6, the pull-down unit 231b may include a switch SW and a resistor Ro.

The switch SW may be connected between the first node N1 and the resistor Ro and the resistor Ro may be connected between the switch SW and the ground voltage GND. Otherwise, the resistor Ro may be connected between the first node N1 and the switch SW and the switch SW may be connected between the resistor Ro and the ground voltage GND.

The switch SW may be turned on when the Q sink signal QSS is enabled and turned off when the Q sink signal QSS is disabled.

The resistor Ro may have a constant resistance value.

As illustrated in FIG. 6, the pull-down unit 231b may selectively reduce the Q factor of the resonance unit 100 by connecting a resistive load between the first node N1 and the ground voltage GND based on the Q sink signal QSS.

Figure 7:
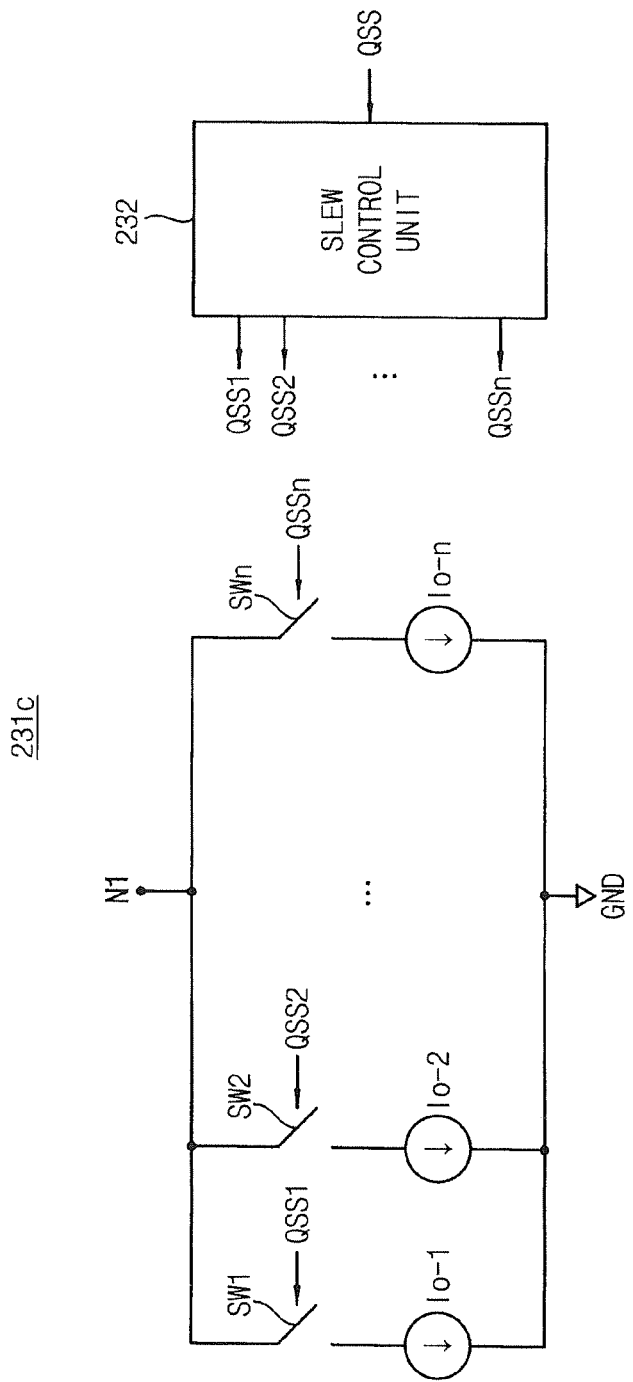
FIG. 7 is a block diagram illustrating an example of a pull-down unit included in the Q sink unit of FIG. 4.

FIG. 7 is a block diagram illustrating an example of the pull-down unit included in the Q sink unit of FIG. 4.

Referring to FIG. 7, the pull-down unit 231c may include a slew control unit 232, first to $n^{th}$ switches SW1, SW2, ..., and SWn and first to $n^{th}$ current sources Io-1, Io-2, ..., and Io-n, wherein N is an integer of 2 or more.

Figure 9:
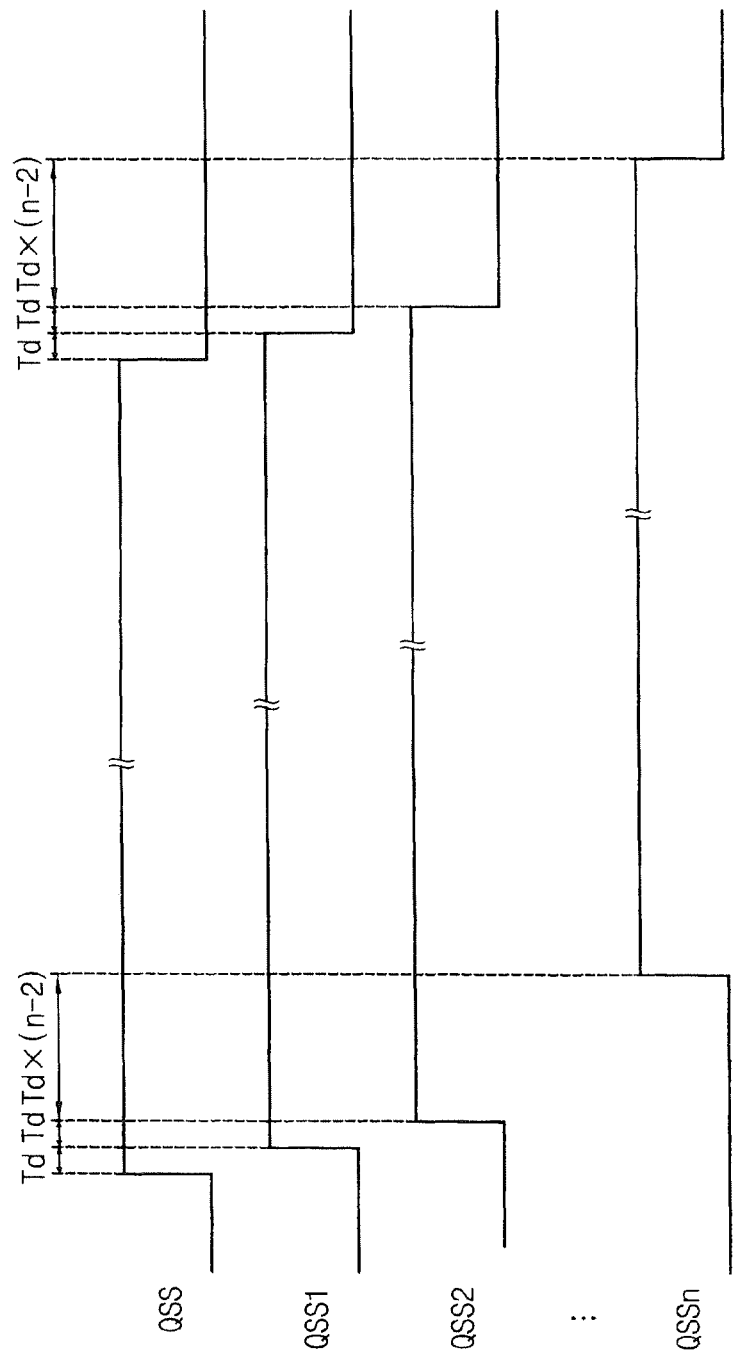
FIG. 9 is a view to explain the operation of a slew control unit included in the pull-down unit of FIGS. 7 and 8.

FIG. 9 is a view to explain the operation of the slew control unit included in the pull-down unit of FIG. 7.

Referring to FIG. 9, the slew control unit 232 may generate first to $n^{th}$ Q sink sub-signals QSS1, QSS2, ..., and QSSn, which are sequentially enabled at a first time interval Td, when the Q sink signal QSS is enabled and may generate first to $n^{th}$ Q sink sub-signals QSS1, QSS2, . . . , and QSSn, which are sequentially disabled at the first time interval Td, when the Q sink signal QSS is disabled.

Referring again to FIG. 7, the first to $n^{th}$ switches SW1, SW2, . . . , and SWn are connected in parallel to the first node N1, the first to $n^{th}$ current sources Io-1, Io-2, . . . , and Io-n are connected in parallel to the ground voltage GND, and the first to $n^{th}$ switches SW1, SW2, . . . , and SWn as well as the first to $n^{th}$ current sources Io-1, Io-2, . . . , and Io-n are connected with each other in series, respectively.

The first to $n^{th}$ switches SW1, SW2, . . . , and SWn may be turned on when the first to $n^{th}$ Q sink sub-signals QSS1, QSS2, . . . , and QSSn are enabled, respectively, and may be turned off when the first to $n^{th}$ Q sink sub-signals QSS1, QSS2, . . . , and QSSn are disabled, respectively.

The first to $n^{th}$ current sources Io-1, Io-2, . . . , and Io-n may generate the current having a constant magnitude.

As shown in FIG. 7, the pull-down unit 231c may selectively reduce the Q factor of the resonance unit 100 by connecting a current load between the first node N1 and the ground voltage GND based on the Q sink signal QSS.

As appreciated by the present inventors, when the pull-down unit 231c concurrently turns on or turns off the first to $n^{th}$ switches SW1, SW2, . . . , and SWn, the magnitude of the first voltage V1 supplied to the NFC chip 200a from the resonance unit 100 may sway in a moment so that the error may occur during the data communication unless otherwise addressed.

As described above, since the pull-down unit 231c sequentially turns on the first to $n^{th}$ current sources Io-1, Io-2, . . . , and Io-n at the first time interval Td when the Q sink signal QSS is enabled and sequentially turns off the first to nth current sources Io-1, Io-2, . . . , and Io-n at the first time interval Td when the Q sink signal QSS is disabled, the pull-down unit 231c can reduce the sway of the first voltage V1 when changing the Q factor of the resonance unit 100.

Figure 8:
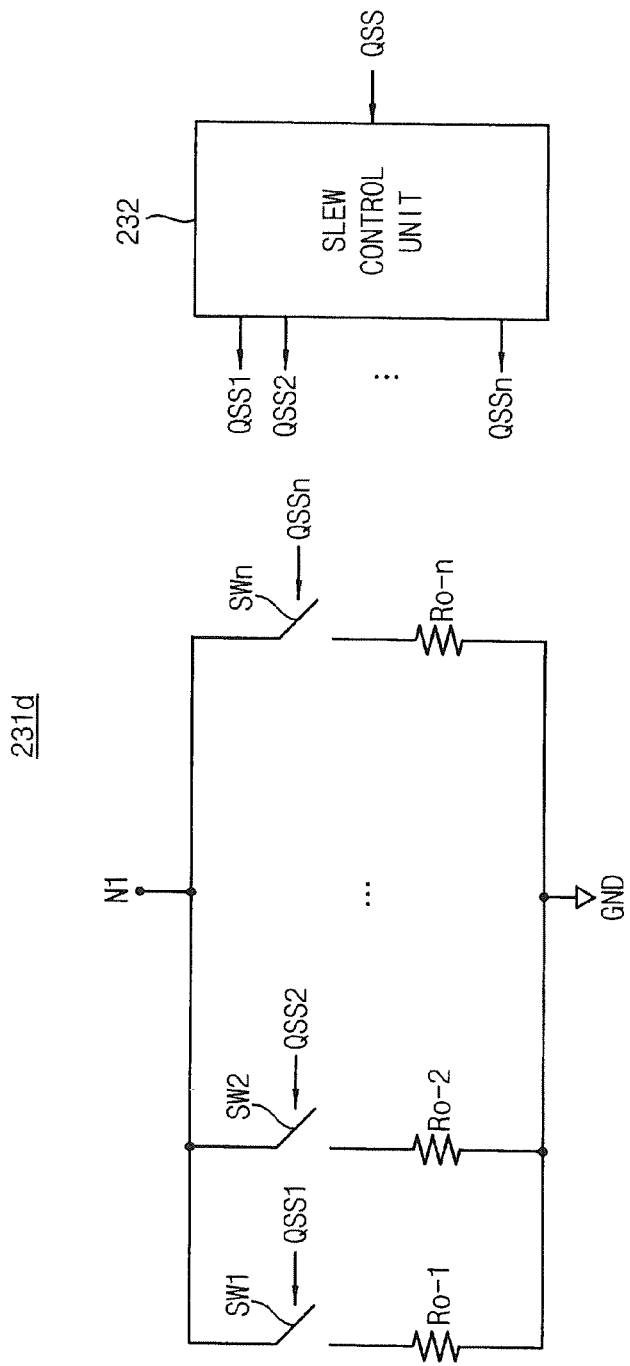
FIG. 8 is a block diagram illustrating an example of a pull-down unit included in the Q sink unit of FIG. 4.

FIG. 8 is a block diagram illustrating an example of the pull-down unit included in the Q sink unit of FIG. 4.

Referring to FIG. 8, the pull-down unit 231d may include a slew control unit 232, first to $n^{th}$ switches SW1, SW2, . . . , and SWn and first to $n^{th}$ resistors Ro-1, Ro-2, . . . , and Ro-n, wherein N is an integer of 2 or more.

FIG. 9 is a view to explain the operation of the slew control unit included in the pull-down unit of FIG. 8.

Referring to FIG. 9, the slew control unit 232 may generate first to nth Q sink sub-signals QSS1, QSS2, . . . , and QSSn, which are sequentially enabled at a first time interval Td, when the Q sink signal QSS is enabled and may generate first to $n^{th}$ Q sink sub-signals QSS1, QSS2, . . . , and QSSn, which are sequentially disabled at the first time interval Td, when the Q sink signal QSS is disabled.

Referring again to FIG. 8, the first to $n^{th}$ switches SW1, SW2, . . . , and SWn are connected in parallel to the first node N1, the first to $n^{th}$ resistors Ro-1, Ro-2, . . . , and Ro-n are connected in parallel to the ground voltage GND, and the first to $n^{th}$ switches SW1, SW2, . . . , and SWn as well as the first to $n^{th}$ resistors Ro-1, Ro-2, . . . , and Ro-n are connected with each other in series, respectively.

The first to $n^{th}$ switches SW1, SW2, . . . , and SWn may be turned on when the first to $n^{th}$ Q sink sub-signals QSS1, QSS2, . . . , and QSSn are enabled, respectively, and may be turned off when the first to $n^{th}$ Q sink sub-signals QSS1, QSS2, . . . , and QSSn are disabled, respectively.

The first to $n^{th}$ resistors Ro-1, Ro-2, . . . , and Ro-n may have a constant resistance value.

As shown in FIG. 8, the pull-down unit 231d may selectively reduce the Q factor of the resonance unit 100 by connecting a resistive load between the first node N1 and the ground voltage GND based on the Q sink signal QSS.

As appreciated by the present inventors, when the pull-down unit 231d concurrently turns on or turns off the first to $n^{th}$ switches SW1, SW2, . . . , and SWn, the magnitude of the first voltage V1 supplied to the NFC chip 200a from the resonance unit 100 may sway in a moment so that the error may occur during the data communication unless otherwise addressed.

As described above, since the pull-down unit 231d sequentially connects the first to nth resistors Ro-1, Ro-2, . . . , and Ro-n between the first node N1 and the ground voltage GND at the first time interval Td when the Q sink signal QSS is enabled and sequentially cuts off the first to $n^{th}$ resistors Ro-1, Ro-2, . . . , and Ro-n connected between the first node N1 and the ground voltage GND at the first time interval Td when the Q sink signal QSS is disabled, the pull-down unit 231d can prevent the sway of the first voltage V1 when changing the Q factor of the resonance unit 100.

Figure 10:
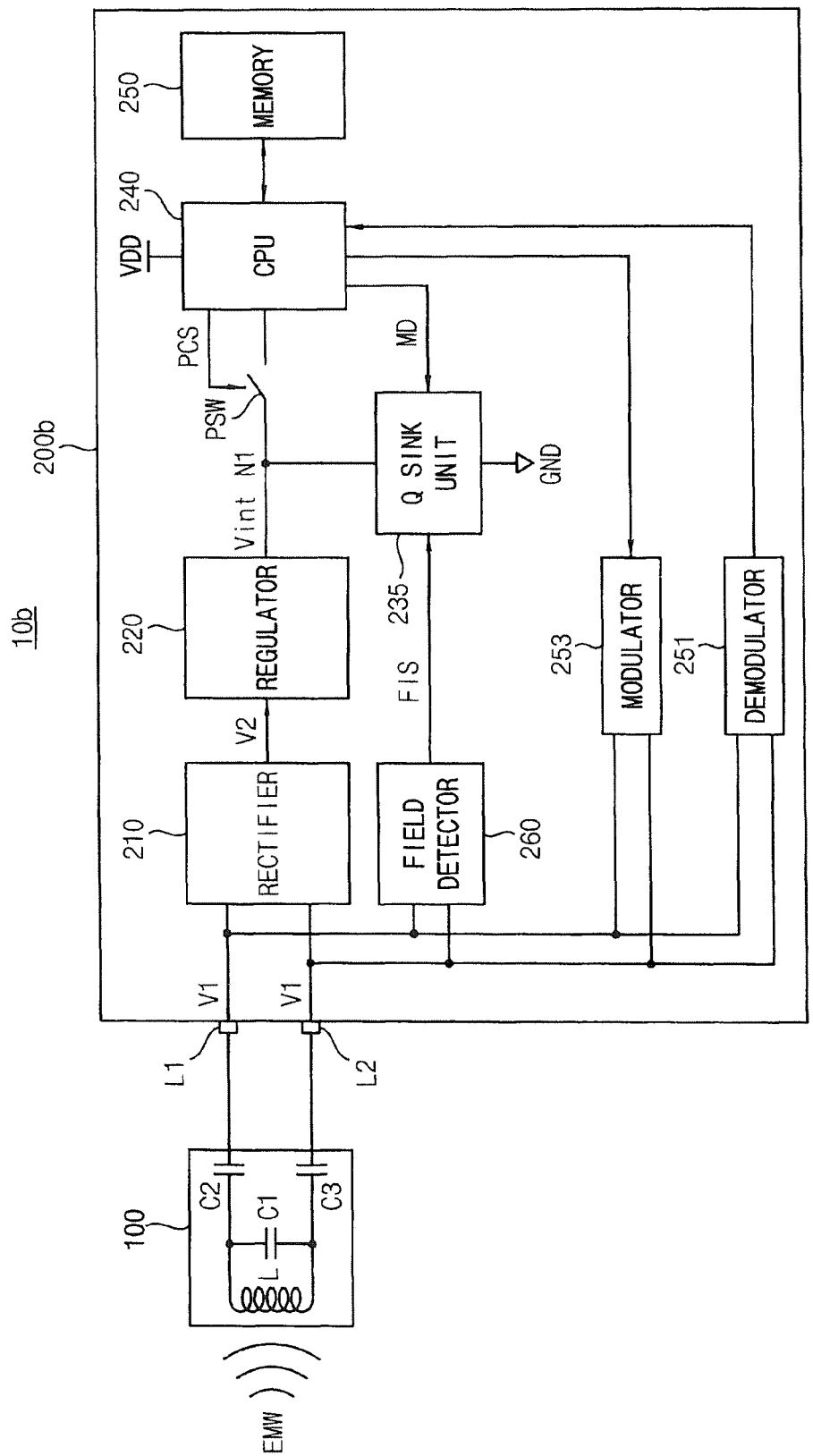
FIG. 10 is a block diagram illustrating an example of the NFC device of FIG. 1.

FIG. 10 is a block diagram illustrating an example of the NFC device of FIG. 1.

Only elements to operate the NFC device 10b in the card mode are illustrated in FIG. 10 and elements to operate the NFC device 10b in the reader mode are omitted in FIG. 10

Referring to FIG. 10, the NFC device 10b may include a resonance unit 100 and an NFC chip 200b.

The NFC device 10b of FIG. 10 is similar to the NFC device 10a of FIG. 3 except that the NFC device 10b of FIG. 10 further includes a field detector 260 and the Q sink unit 230 is replaced with a Q sink unit 235. Thus, in order to avoid redundancy, the following description will be made while focusing on the field detector 260 and the Q sink unit 235 without explaining the elements illustrated in the NFC device 10a.

The field detector 260 may receive the first voltage V1 from the resonance unit 100 to measure the magnitude of the first voltage V1 and may generate a field intensity signal FIS corresponding to the magnitude of the first voltage V1. As the intensity of the EMW received from the external device becomes strong, the magnitude of the first voltage V1 generated from the resonance unit 100 is increased, so the field intensity signal FIS may represent the intensity of EMW received from the external device.

The Q sink unit 235 may be connected between the first node N1 and the ground voltage GND. Based on the mode signal MD supplied from the CPU 240, the Q sink unit 235 is turned on to reduce the Q factor of the resonance unit 100 when the signal receive operation is performed in the card mode and turned off to maintain the Q factor of the resonance unit 100 in the reader mode and when the signal transmit operation is performed in the card mode. In addition, the Q sink unit 235 may control the reduction degree of the Q factor of the resonance unit 100 based on the field intensity signal FIS when the signal receive operation is performed in the card mode.

Figure 11:
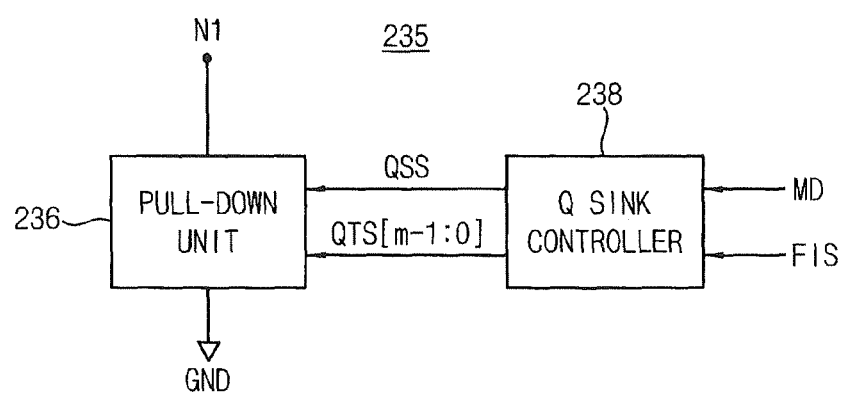
FIG. 11 is a block diagram illustrating an example of a Q sink unit included in the NFC device of FIG. 10.

FIG. 11 is a block diagram illustrating an example of the Q sink unit included in the NFC device of FIG. 10.

Referring to FIG. 11, the Q sink unit 235 may include a pull-down unit 236 and a Q sink controller 238.

The Q sink controller 238 may generate a Q sink signal QSS which is enabled when the signal receive operation is performed in the card mode and is disabled in the reader mode and when the signal transmit operation is performed in the card mode. For instance, the Q sink controller 238 may generate the Q sink signal QSS based on the mode signal MD received from the CPU 240.

In addition, the Q sink controller 238 may generate a Q factor tuning signal QTS[M-1:0] based on the field intensity signal FIS supplied from the field detector 260. The Q factor tuning signal QTS is an m-bit signal and may have a value proportional to a magnitude of the field intensity signal FIS, wherein m is a positive integer.

The pull-down unit 236 may connect the first node N1 to the ground voltage GND through the pull-down load having a magnitude corresponding to a magnitude of the Q factor tuning signal QTS when the Q sink signal QSS is enabled and cut off the first node N1 from the ground voltage GND when the Q sink signal QSS is disabled.

Figure 12:
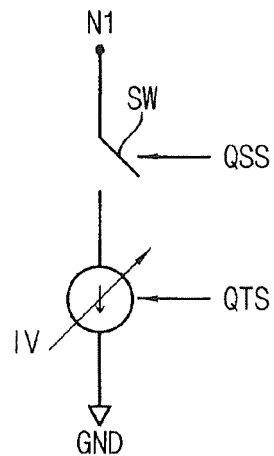
FIG. 12 is a diagram illustrating an example of a pull-down unit included in the Q sink unit of FIG. 11.

FIG. 12 is a diagram illustrating an example of the pull-down unit included in the Q sink unit of FIG. 11.

Referring to FIG. 12, the pull-down unit 236a may include a switch SW and a variable current source IV.

The switch SW may be connected between the first node N1 and the variable current source IV and the variable current source IV may be connected between the switch SW and the ground voltage GND. Otherwise, the variable current source IV may be connected between the first node N1 and the switch SW and the switch SW may be connected between the variable current source IV and the ground voltage GND.

The switch SW may be turned on when the Q sink signal QSS is enabled and turned off when the Q sink signal QSS is disabled.

The variable current source IV may generate a current having a magnitude corresponding to the magnitude of the Q factor tuning signal QTS.

As illustrated in FIG. 12, the pull-down unit 236a may selectively reduce the Q factor of the resonance unit 100 by connecting a current load between the first node N1 and the ground voltage GND based on the Q sink signal QSS.

In addition, when the pull-down unit 236a reduces the Q factor of the resonance unit 100, the pull-down unit 236a may adjust the reduction degree of the Q factor of the resonance unit 100 by adjusting the magnitude of the current load connected between the first node N1 and the ground voltage GND based on the Q factor tuning signal QTS.

Figure 13:
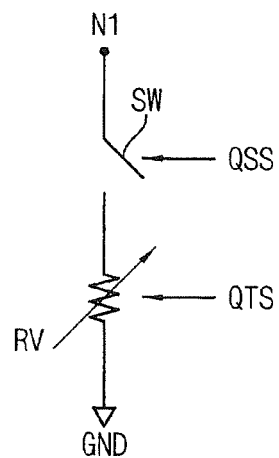
FIG. 13 is a diagram illustrating an example of a pull-down unit included in the Q sink unit of FIG. 11.

FIG. 13 is a diagram illustrating an example of the pull-down unit included in the Q sink unit of FIG. 11.

Referring to FIG. 13, the pull-down unit 236b may include a switch SW and a variable resistor RV.

The switch SW may be connected between the first node N1 and the variable resistor RV and the variable resistor RV may be connected between the switch SW and the ground voltage GND. Otherwise, the variable resistor RV may be connected between the first node N1 and the switch SW and the switch SW may be connected between the variable resistor RV and the ground voltage GND.

The switch SW may be turned on when the Q sink signal QSS is enabled and turned off when the Q sink signal QSS is disabled.

The variable resistor RV may have a resistance value corresponding to the Q factor tuning signal QTS.

As illustrated in FIG. 13, the pull-down unit 236b may selectively reduce the Q factor of the resonance unit 100 by connecting a resistive load between the first node N1 and the ground voltage GND based on the Q sink signal QSS.

In addition, when the pull-down unit 236b reduces the Q factor of the resonance unit 100, the pull-down unit 236b may adjust the reduction degree of the Q factor of the resonance unit 100 by adjusting the magnitude of the resistive load connected between the first node N1 and the ground voltage GND based on the Q factor tuning signal QTS.

Figure 14:
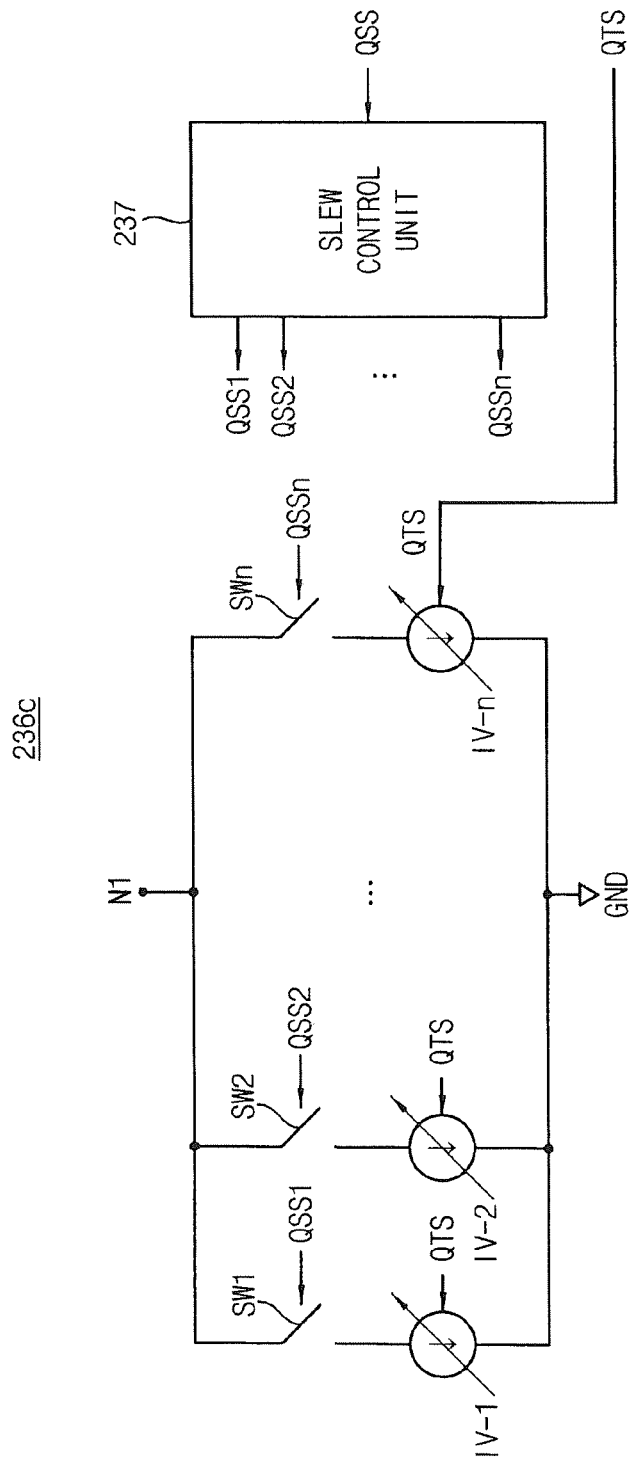
FIG. 14 is a block diagram illustrating an example of a pull-down unit included in the Q sink unit of FIG. 11.

FIG. 14 is a block diagram illustrating an example of the pull-down unit included in the Q sink unit of FIG. 11.

Referring to FIG. 14, the pull-down unit 236c may include a slew control unit 237, first to $n^{th}$ switches SW1, SW2, ..., and SWn and first to $n^{th}$ variable current sources IV-1, IV-2, ..., and IV-n, wherein N is an integer of 2 or more.

As illustrated in FIG. 9, the slew control unit 237 may generate first to $n^{th}$ Q sink sub-signals QSS1, QSS2, ..., and QSSn, which are sequentially enabled at a first time interval Td, when the Q sink signal QSS is enabled and may generate first to $n^{th}$ Q sink sub-signals QSS1, QSS2, ..., and QSSn, which are sequentially disabled at the first time interval Td, when the Q sink signal QSS is disabled.

The first to $n^{th}$ switches SW1, SW2, ..., and SWn are connected in parallel to the first node N1, the first to $n^{th}$ variable current sources IV-1, IV-2, ..., and IV-n are connected in parallel to the ground voltage GND, and the first to $n^{th}$ switches SW1, SW2, ..., and SWn as well as the first to $n^{th}$ variable current sources IV-1, IV-2, ..., and IV-n are connected with each other in series, respectively.

The first to $n^{th}$ switches SW1, SW2, ..., and SWn may be turned on when the first to $n^{th}$ Q sink sub-signals QSS1, QSS2, ..., and QSSn are enabled, respectively, and may be turned off when the first to $n^{th}$ Q sink sub-signals QSS1, QSS2, ..., and QSSn are disabled, respectively.

The first to $n^{th}$ variable current sources IV-1, IV-2, ..., and IV-n may generate the current having a magnitude corresponding to the magnitude of the Q factor tuning signal QTS.

As shown in FIG. 14, the pull-down unit 236c may selectively reduce the Q factor of the resonance unit 100 by connecting a current load between the first node N1 and the ground voltage GND based on the Q sink signal QSS.

As appreciated by the present inventors, when the pull-down unit 236c concurrently turns on or turns off the first to $n^{th}$ switches SW1, SW2, ..., and SWn, the magnitude of the first voltage V1 supplied to the NFC chip 200b from the resonance unit 100 may sway in a moment so that the error may occur during the data communication unless otherwise addressed.

As described above, since the pull-down unit 236c sequentially turns on the first to $n^{th}$ variable current sources IV-1, IV-2, ..., and IV-n at the first time interval Td when the Q sink signal QSS is enabled and sequentially turns off the first to $n^{th}$ variable current sources IV-1, IV-2, ..., and IV-n at the first time interval Td when the Q sink signal QSS is disabled, the pull-down unit 236c can reduce the sway of the first voltage V1 when changing the Q factor of the resonance unit 100.

In addition, when the pull-down unit 236c reduces the Q factor of the resonance unit 100, the pull-down unit 236c may adjust the reduction degree of the Q factor of the resonance unit 100 by adjusting the magnitude of the current load connected between the first node N1 and the ground voltage GND based on the Q factor tuning signal QTS.

Figure 15:
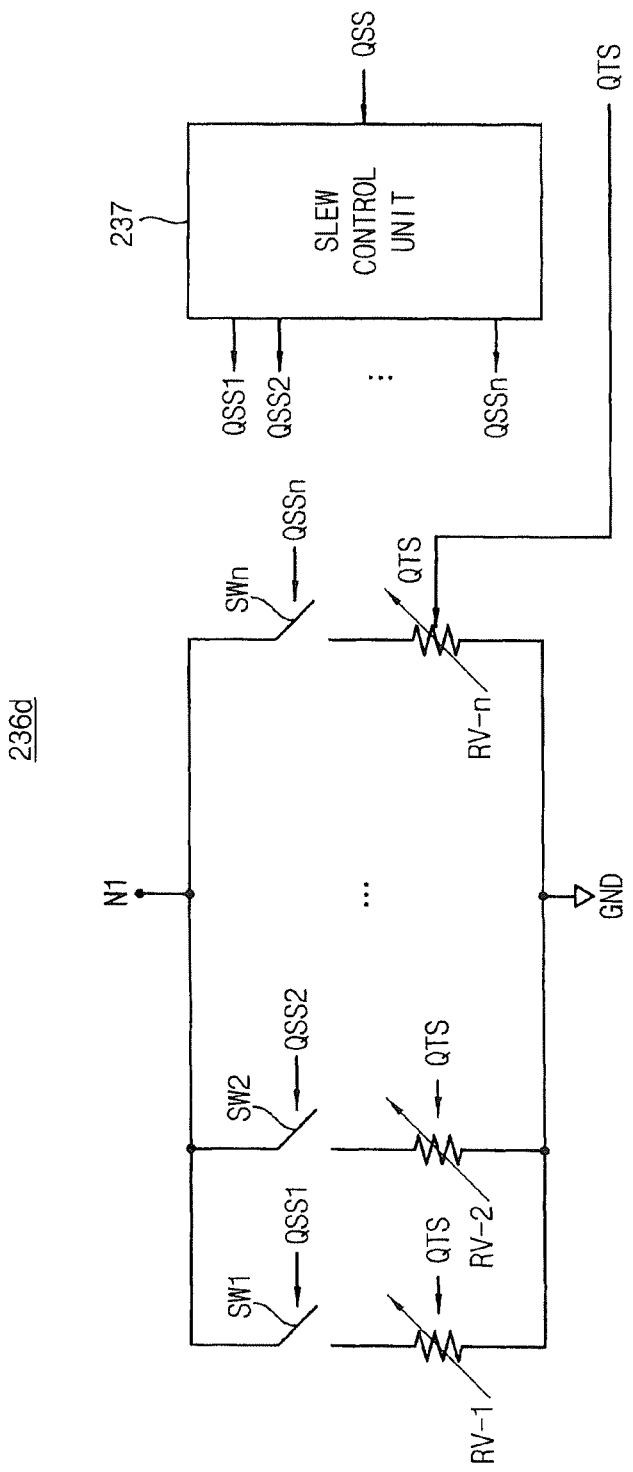
FIG. 15 is a block diagram illustrating an example of a pull-down unit included in the Q sink unit of FIG. 11.

FIG. 15 is a block diagram illustrating an example of the pull-down unit included in the Q sink unit of FIG. 11.

Referring to FIG. 15, the pull-down unit 236d may include a slew control unit 237, first to $n^{th}$ switches SW1, SW2, ..., and SWn and first to $n^{th}$ variable resistors RV-1, RV-2, ..., and RV-n, wherein N is an integer of 2 or more.

As illustrated in FIG. 9, the slew control unit 237 may generate first to $n^{th}$ Q sink sub-signals QSS1, QSS2, ..., and QSSn, which are sequentially enabled at a first time interval Td, when the Q sink signal QSS is enabled and may generate first to $n^{th}$ Q sink sub-signals QSS1, QSS2, ..., and QSSn, which are sequentially disabled at the first time interval Td, when the Q sink signal QSS is disabled.

The first to $n^{th}$ switches SW1, SW2, ..., and SWn are connected in parallel to the first node N1, the first to $n^{th}$ variable resistors RV-1, RV-2, ..., and RV-n are connected in parallel to the ground voltage GND, and the first to $n^{th}$ switches SW1, SW2, ..., and SWn as well as the first to $n^{th}$ variable resistors RV-1, RV-2, ..., and RV-n are connected with each other in series, respectively.

The first to $n^{th}$ switches SW1, SW2, ..., and SWn may be turned on when the first to $n^{th}$ Q sink sub-signals QSS1, QSS2, ..., and QSSn are enabled, respectively, and may be turned off when the first to $n^{th}$ Q sink sub-signals QSS1, QSS2, ..., and QSSn are disabled, respectively.

The first to $n^{th}$ variable resistors RV-1, RV-2, ..., and RV-n may have a resistance value corresponding to the Q factor tuning signal QTS.

As shown in FIG. 15, the pull-down unit 236d may selectively reduce the Q factor of the resonance unit 100 by connecting a resistive load between the first node N1 and the ground voltage GND based on the Q sink signal QSS.

As appreciated by the present inventors, when the pull-down unit 236d concurrently turns on or turns off the first to $n^{th}$ switches SW1, SW2, ..., and SWn, the magnitude of the first voltage V1 supplied to the NFC chip 200b from the resonance unit 100 may sway in a moment so that the error may occur during the data communication unless otherwise addressed.

As described above, since the pull-down unit 236d sequentially connects the first to $n^{th}$ variable resistors RV-1, RV-2, ..., and RV-n between the first node N1 and the ground voltage GND at the first time interval Td when the Q sink signal QSS is enabled and sequentially cuts off the first to $n^{th}$ variable resistors RV-1, RV-2, ..., and RV-n connected between the first node N1 and the ground voltage GND at the first time interval Td when the Q sink signal QSS is disabled, the pull-down unit 236d can reduce the sway of the first voltage V1 when changing the Q factor of the resonance unit 100.

In addition, when the pull-down unit 236d reduces the Q factor of the resonance unit 100, the pull-down unit 236d may adjust the reduction degree of the Q factor of the resonance unit 100 by adjusting the magnitude of the resistive load connected between the first node N1 and the ground voltage GND based on the Q factor tuning signal QTS.

Figure 16:
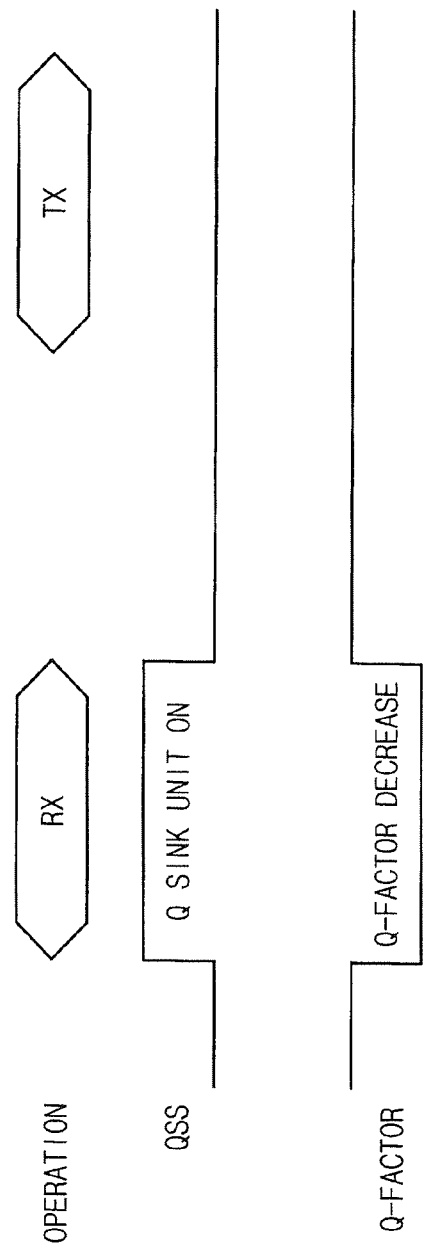
FIG. 16 is a view to explain the operation of the NFC devices of FIGS. 3 and 10.

FIG. 16 is a block diagram to explain the operation the NFC devices of FIGS. 3 to 10.

As illustrated in FIG. 16, the Q sink controllers 233 and 238 may generate the Q sink signal QSS which is enabled when the signal receive operation RX is performed in the card mode and is disabled in the reader mode and when the signal transmit operation TX is performed in the card mode. Therefore, since the Q sink units 230 and 235 are turned on when the signal receive operation is performed in the card mode, the resonance unit 100 may have the frequency characteristic as shown in the second graph B of FIG. 2, so the Q factor of the resonance unit 100 may be reduced. In addition, since the Q sink units 230 and 235 are turned off in the reader mode and when the signal transmit operation is performed in the card mode, the resonance unit 100 may have the frequency characteristic as shown in the first graph A of FIG. 2, so the Q factor of the resonance unit 100 may be maintained.

Figure 17A:
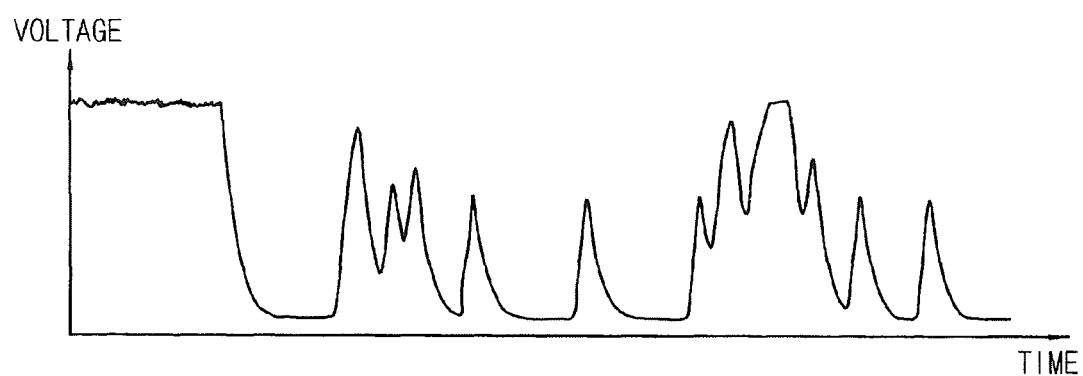
FIGS. 17A and 17B are views to explain the effects of the NFC devices of FIGS. 3 and 10.
Figure 17B:

FIGS. 17A and 17B are views to explain the effects of the NFC devices of FIGS. 3 and 10.

The graph shown in FIG. 17A represents the first voltage V1 supplied to the NFC chips 200a and 200b from the resonance unit 100 in response to the high-speed signal having a frequency of 848 Kbps when the resonance unit 100 has the frequency characteristic as shown in the first graph A of FIG. 2 because the Q factor of the resonance unit 100 is not reduced (i.e., maintained) when the signal receive operation is performed in the card mode, and the graph shown in FIG. 17B represents the first voltage V1 supplied to the NFC chips 200a and 200b from the resonance unit 100 in response to the high-speed signal having a frequency of 848 Kbps when the resonance unit 100 has the frequency characteristic as shown in the second graph B of FIG. 2 because the Q factor of the resonance unit 100 is reduced when the signal receive operation is performed in the card mode.

As shown in the graph of FIG. 17A, if the Q factor of the resonance unit 100 is not reduced, the high-speed signal is filtered through the resonance unit 100 so that a signal corresponding to the first voltage V1 supplied to the NFC chips 200a and 200b from the resonance unit 100 may be distorted. Thus, when the NFC chips 200a and 200b demodulates the signal corresponding to the first voltage V1 through the ASK (magnitude shift keying) scheme, the input data transmitted from the external device may not be normally received.

However, as shown in the graph of FIG. 17B, if the Q factor of the resonance unit 100 is reduced, the high-speed signal is not filtered through the resonance unit 100 so that a signal corresponding to the first voltage V1 supplied to the NFC chips 200a and 200b from the resonance unit 100 may not be distorted (or distorted less). Thus, when the NFC chips 200a and 200b demodulates the signal corresponding to the first voltage V1 through the ASK (magnitude shift keying) scheme, the input data transmitted from the external device may be normally received.

Therefore, the NFC devices 10a and 10b according to example embodiments can stably receive the high-speed signal when the signal receive operation is performed without degrading the characteristic of the load modulation when the signal receive operation is performed.

Figure 18:
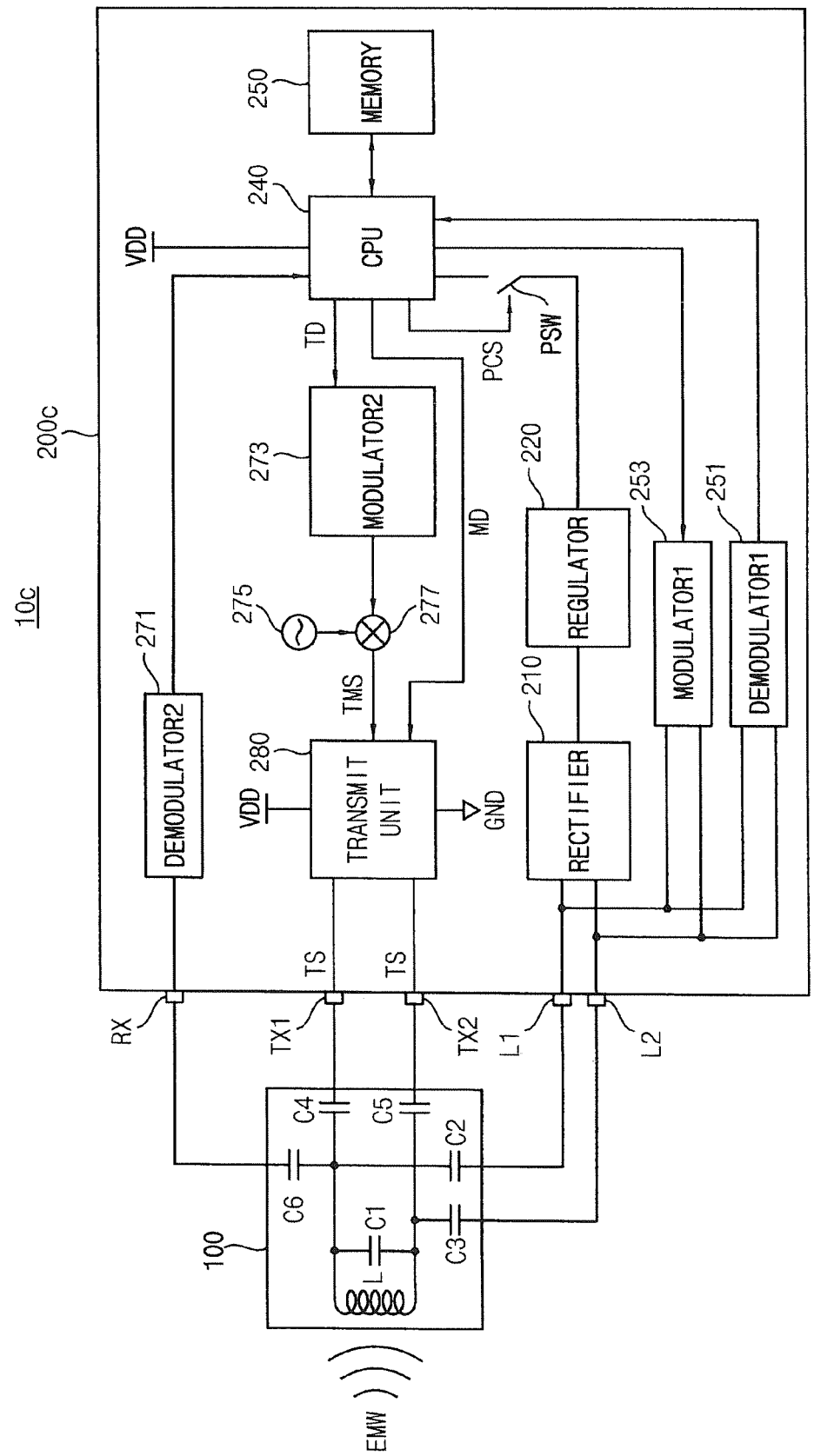
FIG. 18 is a block diagram illustrating an example of the NFC device of FIG. 1.

FIG. 18 is a block diagram illustrating an example of the NFC device of FIG. 1.

Elements used to operate the NFC device 10c in the reader mode as well as elements used to operate the NFC device 10c in the card mode are illustrated in FIG. 18.

Referring to FIG. 18, the NFC device 10c may include a resonance unit 100 and an NFC chip 200c.

The NFC chip 200c may be connected to the resonance unit 100 through a first power terminal L1, a second power terminal L2, a first transmit terminal TX1, a second transmit terminal TX2, and a receive terminal RX.

The resonance unit 100 may include a resonance circuit having an antenna L and a first capacitor C1, a first filter having a second capacitor C2 and a third capacitor C3 to connect the resonance circuit to the first and second power terminals L1 and L2, a second filter having a sixth capacitor C6 to connect the resonance circuit to the receive terminal RX, and a matching unit including a fourth capacitor C4 and a fifth capacitor C5 to connect the resonance circuit to the first transmit terminal TX1 and the second transmit terminal TX2 in order to perform the impedance matching.

The configuration of the resonance unit 100 illustrated in FIG. 18 is an example only and the configuration of the resonance unit 100 according to example embodiments may not be limited to the above, but may be variously modified.

The NFC chip 200c may perform the signal transmit operation and the signal receive operation through the first power terminal L1 and the second power terminal L2 in the card mode, perform the signal transmit operation through the first transmit terminal TX1 and the second transmit terminal TX2 in the reader mode, and perform the signal receive operation through the receive terminal RX in the reader mode.

The NFC chip 200c may include a rectifier 210, a regulator 220, a central processing unit (CPU) 240, a power switch PSW, a memory 250, a first demodulator 251, a first modulator 253, a second demodulator 271, a second modulator 273, an oscillator 275, a mixer 277 and a transmit unit 280.

The rectifier 210, the regulator 220, the power switch PSW, the first demodulator 251 and the first modulator 253 can be equivalent to the regulator 220, the power switch PSW, the demodulator 251 and the modulator 253 included in the NFC device 10a of FIG. 3.

When the signal receive operation is performed in the reader mode, the second demodulator 271 generates the input data by demodulating the signal supplied from the resonance unit 100 through the receive terminal RX to provide the input data to the CPU 240. The CPU 240 may store the input data in the memory 250.

When the signal transmit operation is performed in the reader mode, the CPU 240 may read out the output data TD from the memory 250 to provide the output data TD to the second modulator 273, the second modulator 273 may modulate the output data TD to generate a modulation signal, the oscillator 275 may generate a carrier signal having a frequency corresponding to a carrier frequency (for instance, 13.56 MHz), and the mixer 277 may generate a transmit modulation signal TMS by synthesizing the carrier signal with the modulation signal.

The transmit unit 280 may be connected between the supply voltage VDD and the ground voltage GND.

The transmit unit 280 may receive the transmit modulation signal TMS from the mixer 277 to generate a transmit signal TS corresponding to the transmit modulation signal TMS in the reader mode. The resonance unit 100 may generate the EMW corresponding to the transmit signal TS supplied from the transmit unit 280 through the first transmit terminal TX1 and the second transmit terminal TX2. For instance, in the reader mode, the transmit unit 280 may connect the first transmit terminal TX1 and the second transmit terminal TX2 to the supply voltage VDD through a pull-up load or connect the first transmit terminal TX1 and the second transmit terminal TX2 to the ground voltage GND through a pull-down load based on the transmit modulation signal TMS so that the transmit signal TS may be generated from the first transmit terminal TX1 and the second transmit terminal TX2.

The transmit unit 280 may reduce the Q factor of the resonance unit 100 when the signal receive operation is performed in the card mode and may maintain the Q factor of the resonance unit 100 when the signal transmit operation is performed in the card mode. For instance, the transmit unit 280 may reduce the Q factor of the resonance unit 100 when the signal receive operation is performed in the card mode by connecting the first transmit terminal TX1 and the second transmit terminal TX2 to the ground voltage GND through the pull-down load and may maintain the Q factor of the resonance unit 100 when the signal transmit operation is performed in the card mode by cutting off the first transmit terminal TX1 and the second transmit terminal TX2 from the ground voltage GND and the supply voltage VDD.

In one example embodiment, the CPU 240 may provide the mode signal MD, which represents the card mode or the reader mode and the signal receive operation or the signal transmit operation when the mode is the card mode, to the transmit unit 280 and the transmit unit 280 may selectively reduce the Q factor of the resonance unit 100 based on the mode signal MD.

Figure 19:
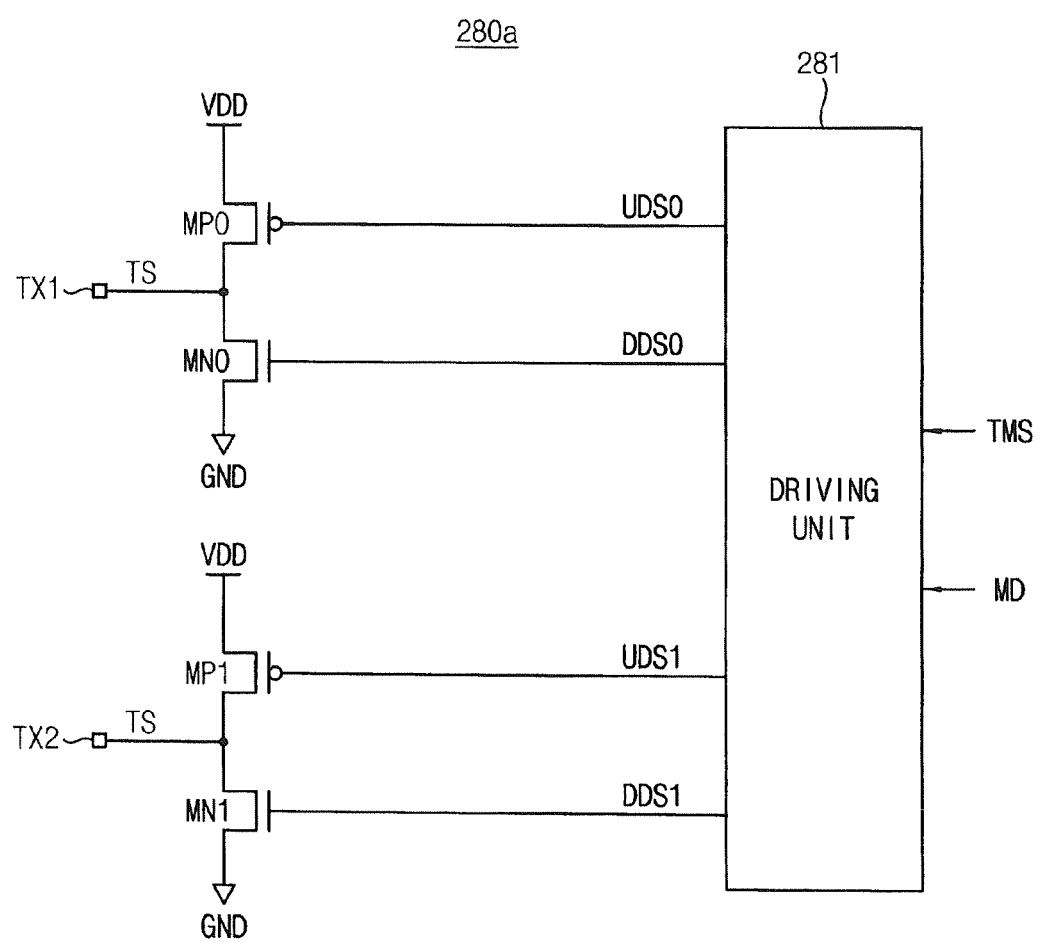
FIG. 19 is a block diagram illustrating an example of a transmit unit included in the NFC device of FIG. 18.

FIG. 19 is a block diagram illustrating an example of the transmit unit included in the NFC device of FIG. 18.

Referring to FIG. 19, the transmit unit 280a may include a first pull-up transistor MP0, a second pull-up transistor MP1, a first pull-down transistor MN0, a second pull-down transistor MN1 and a driving unit 281.

The first pull-up transistor MP0 and the second pull-up transistor MP1 may be PMOS (p-type metal oxide semiconductor) transistors and the first pull-down transistor MN0 and the second pull-down transistor MN1 may be NMOS (n-type metal oxide semiconductor) transistors.

The first pull-up transistor MP0 may be connected between the supply voltage VDD and the first transmit terminal TX1 and the first pull-down transistor MN0 may be connected between the first transmit terminal TX1 and the ground voltage GND.

The second pull-up transistor MP1 may be connected between the supply voltage VDD and the second transmit terminal TX2 and the second pull-down transistor MN1 may be connected between the second transmit terminal TX2 and the ground voltage GND.

The driving unit 281 may drive the first pull-up transistor MP0 through a first pull-up driving signal UDS0, may drive the first pull-down transistor MN0 through a first pull-down driving signal DDS0, may drive the second pull-up transistor MP1 through a second pull-up driving signal UDS1, and may drive the second pull-down transistor MN1 through a second pull-down driving signal DDS1.

The driving unit 281 may determine whether the NFC chip 200c is in the card mode or the reader mode and may determine the signal receive operation or the signal transmit operation when the mode is the card mode based on the mode signal MD supplied from the CPU 240.

The driving unit 281 may selectively turn on one of the first pull-up transistor MP0 and the first pull-down transistor MN0 and one of the second pull-up transistor MP1 and the second pull-down transistor MN1 based on the transmit modulation signal TMS in the reader mode.

The driving unit 281 may turn off the first pull-up transistor MP0 and the second pull-up transistor MP1 and may turn on the first pull-down transistor MN0 and the second pull-down transistor MN1 when the signal receive operation is performed in the card mode.

The driving unit 281 may turn off all of the first pull-up transistor MP0, the second pull-up transistor MP1, the first pull-down transistor MN0 and the second pull-down transistor MN1 when the signal transmit operation is performed in the card mode.

As described above, the transmit unit 280a drives the first pull-up transistor MP0, the second pull-up transistor MP1, the first pull-down transistor MN0 and the second pull-down transistor MN1 based on the transmit modulation signal TMS in the reader mode to perform the normal operation to provide the transmit modulation signal TMS to the resonance unit 100. In addition, the transmit unit 280a connects the first transmit terminal TX1 and the second transmit terminal TX2 to the ground voltage GND through the first pull-down transistor MN0 and the second pull-down transistor MN1, respectively, thereby reducing the Q factor of the resonance unit 100 when the signal receive operation is performed in the card mode.

Figure 20:
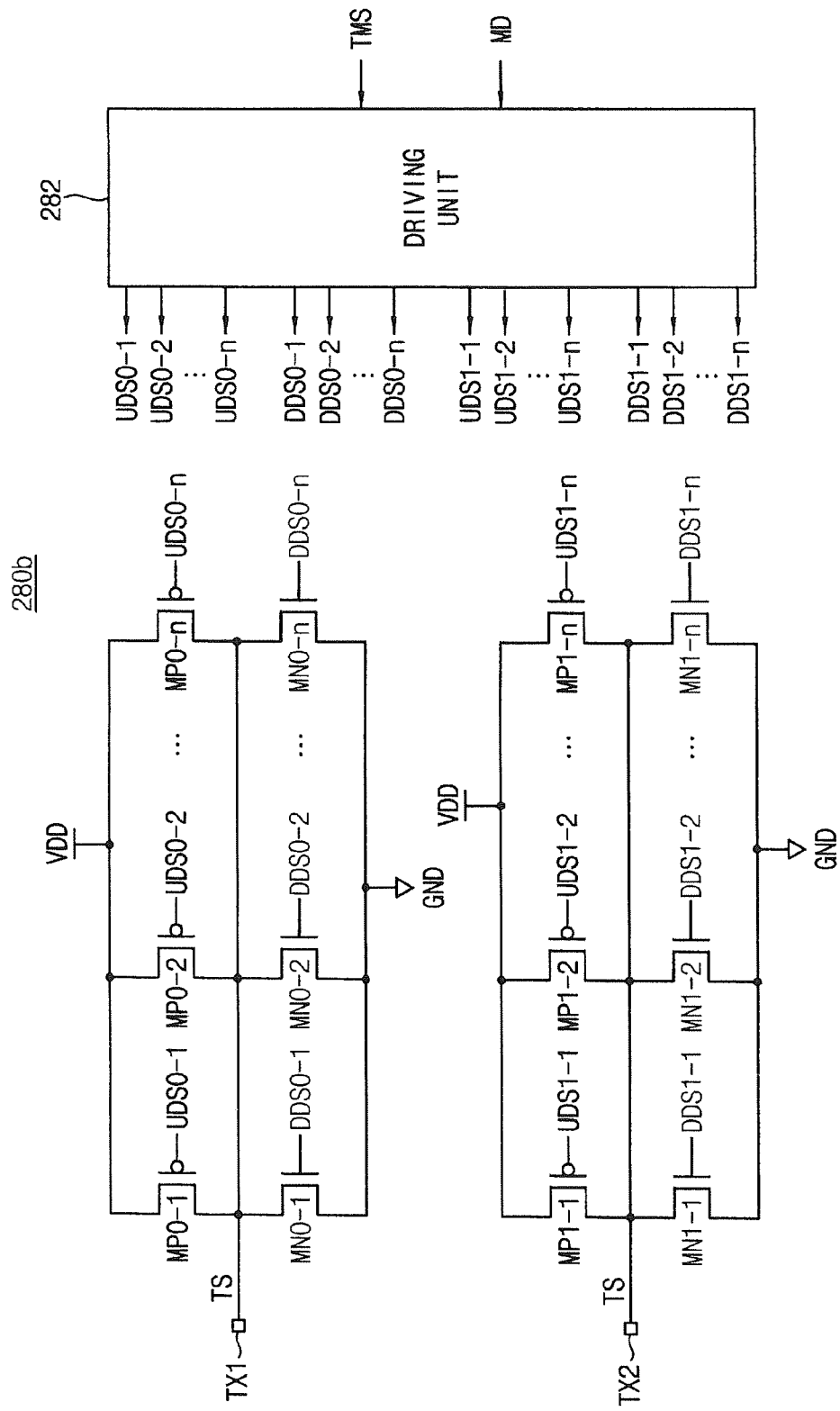
FIG. 20 is a block diagram illustrating an example of a transmit unit included in the NFC device of FIG. 18.

FIG. 20 is a block diagram illustrating another example of the transmit unit included in the NFC device of FIG. 18.

Referring to FIG. 20, the transmit unit 280b may include $(1-1)^{th}$ to $(1-n)^{th}$ pull-up transistors MP0-1, MP0-2, . . . , and MP0-n, second-1 to second-n pull-up transistors MP1-1, MP1-2, . . . , and MP1-n, $(1-1)^{th}$ to $(1-n)^{th}$ pull-down transistors MN0-1, MN0-2, . . . , and MN0-n, second-1 to second-n pull-down transistors MN1-1, MN1-2, . . . , and MN1-n, and a driving unit 282.

The $(1-1)^{th}$ to $(1-n)^{th}$ pull-up transistors MP0-1, MP0-2, . . . , and MP0-n and the second-1 to second-n pull-up transistors MP1-1, MP1-2, . . . , and MP1-n may be PMOS transistors, and the $(1-1)^{th}$ to $(1-n)^{th}$ pull-down transistors MN0-1, MN0-2, . . . , and MN0-n and the second-1 to second-n pull-down transistors MN1-1, MN1-2, . . . , and MN1-n may be the NMOS transistors.

The $(1-1)^{th}$ to $(1-n)^{th}$ pull-up transistors MP0-1, MP0-2, . . . , and MP0-n may be connected in parallel between the supply voltage VDD and the first transmit terminal TX1, and the $(1-1)^{th}$ to $(1-n)^{th}$ pull-down transistors MN0-1, MN0-2, . . . , and MN0-n may be connected in parallel between the first transmit terminal TX1 and the ground voltage GND.

The second-n pull-up transistors MP1-1, MP1-2, . . . , and MP1-n may be connected in parallel between the supply voltage VDD and the second transmit terminal TX2 and the second-1 to second-n pull-down transistors MN1-1, MN1-2, . . . , and MN1-n may be connected in parallel between the second transmit terminal TX2 and the ground voltage GND.

The driving unit 282 may drive the $(1-1)^{th}$ to $(1-n)^{th}$ pull-up transistors MP0-1, MP0-2, . . . , and MP0-n through $(1-1)^{th}$ to $(1-n)^{th}$ pull-up driving signals UDS0-1, UDS0-2, . . . , and UDS0-n, respectively, drive the $(1-1)^{th}$ to $(1-n)^{th}$ pull-down transistors MN0-1, MN0-2, . . . , and MN0-n through $(1-1)^{th}$ to $(1-n)^{th}$ pull-down driving signals DDS0-1, DDS0-2, . . . , and DDS0-n, respectively, drive the second-n pull-up transistors MP1-1, MP1-2, . . . , and MP1-n through second-1 to second-n pull-up driving signals UDS1-1, UDS1-2, . . . , and UDS1-n, respectively, and drive the second-1 to second-n pull-down transistors MN1-1, MN1-2, . . . , and MN1-n through second-1 to second-n pull-down driving signals DDS1-1, DDS1-2, . . . , and DDS1-n, respectively.

The driving unit 282 may determine whether the NFC chip 200c is in the card mode or the reader mode and may determine the signal receive operation or the signal transmit operation when the mode is the card mode based on the mode signal MD supplied from the CPU 240.

In the reader mode, the driving unit 282 may turn on the $(1-1)^{th}$ to $(1-n)^{th}$ pull-up transistors MP0-1, MP0-2, . . . , and MP0-n or the $(1-1)^{th}$ to $(1-n)^{th}$ pull-down transistors MN0-1, MN0-2, . . . , and MN0-n and may turn on the second-n pull-up transistors MP1-1, MP1-2, . . . , and MP1-n or the second-1 to second-n pull-down transistors MN1-1, MN1-2, . . . , and MN1-n based on the transmit modulation signal TMS.

In the card mode, the driving unit 282 generates the $(1-1)^{th}$ to $(1-n)^{th}$ pull-up driving signals UDS0-1, UDS0-2, . . . , and UDS0-n and the second-1 to second-n pull-up driving signals UDS1-1, UDS1-2, . . . , and UDS1-n having the logic high level, so the driving unit 282 can turn off the $(1-1)^{th}$ to $(1-n)^{th}$ pull-up transistors MP0-1, MP0-2, . . . , and MP0-n and the second-1 to second-n pull-up transistors MP1-1, MP1-2, . . . , and MP1-n.

Figure 21:
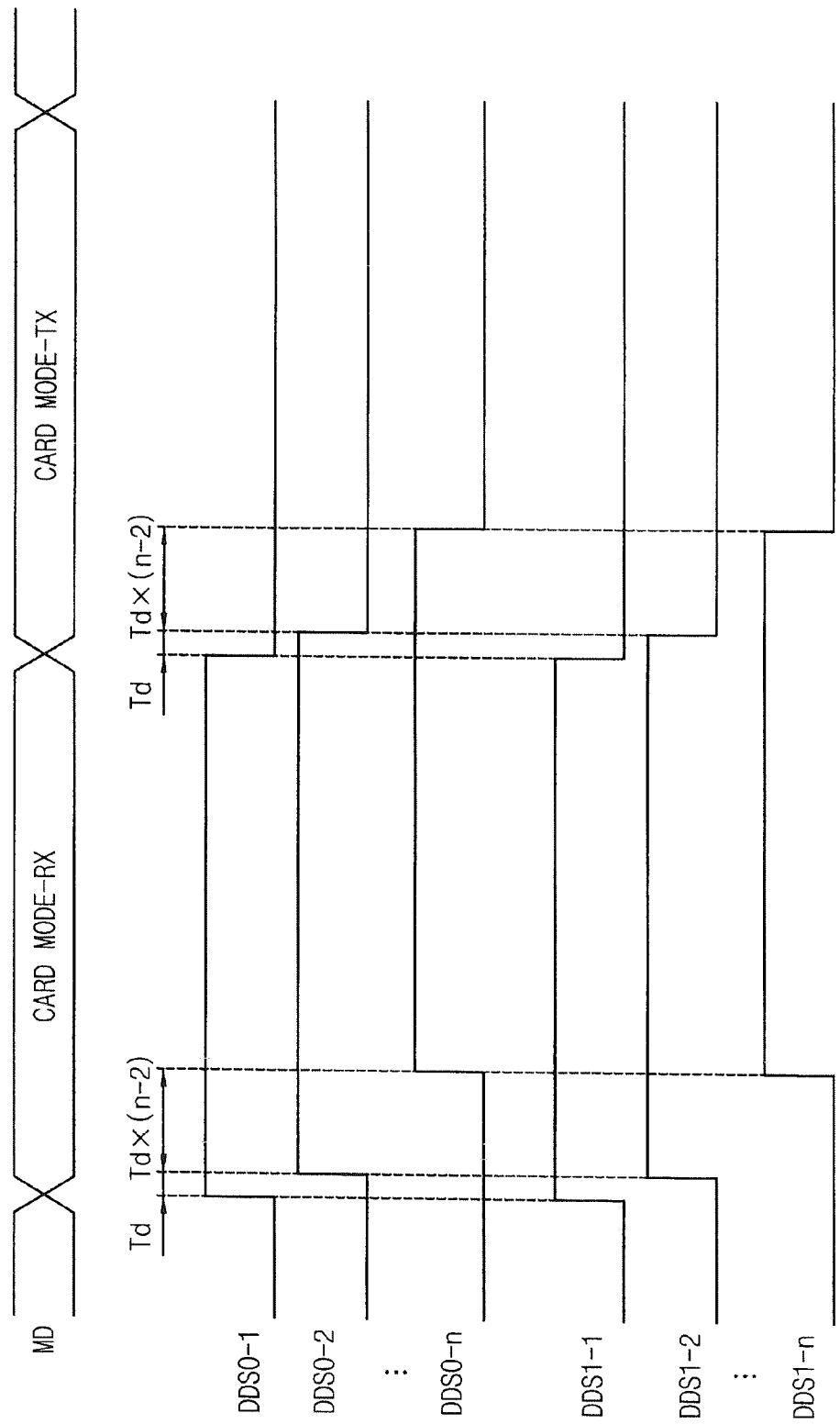
FIG. 21 is a view to explain the operation of a driving unit included in the transmit unit of FIG. 20.

In addition, as shown in FIG. 21, the driving unit 282 may sequentially turn on the $(1-1)^{th}$ to $(1-n)^{th}$ pull-down transistors MN0-1, MN0-2, . . . , and MN0-n and the second-1 to second-n pull-down transistors MN1-1, MN1-2, . . . , and MN1-n at the first time interval Td by sequentially enabling the $(1-1)^{th}$ to $(1-n)^{th}$ pull-down driving signals DDS0-1, DDS0-2, . . . , and DDS0-n and the second-1 to second-n pull-down driving signals DDS1-1, DDS1-2, . . . , and DDS1-n at the first time interval Td when the signal receive operation RX is performed in the card mode.

Further, as shown in FIG. 21, the driving unit 282 may sequentially turn off the $(1-1)^{th}$ to $(1-n)^{th}$ pull-down transistors MN0-1, MN0-2, . . . , and MN0-n and the second-1 to second-n pull-down transistors MN1-1, MN1-2, . . . , and MN1-n at the first time interval Td by sequentially disabling the $(1-1)^{th}$ to $(1-n)^{th}$ pull-down driving signals DDS0-1, DDS0-2, . . . , and DDS0-n and the second-1 to second-n pull-down driving signals DDS1-1, DDS1-2, . . . , and DDS1-n at the first time interval Td when the signal transmit operation TX is performed in the card mode.

As described above, the transmit unit 280b drives the $(1-1)^{th}$ to $(1-n)^{th}$ pull-up transistors MP0-1, MP0-2, . . . , and MP0-n, the second-n pull-up transistors MP1-1, MP1-2, . . . , and MP1-n, the $(1-1)^{th}$ to $(1-n)^{th}$ pull-down transistors MN0-1, MN0-2, . . . , and MN0-n and the second-1 to second-n pull-down transistors MN1-1, MN1-2, . . . , and MN1-n based on the transmit modulation signal TMS in the reader mode to perform the normal operation to provide the transmit signal TS to the resonance unit 100. In addition, when the signal receive operation is performed in the card mode, the transmit unit 280b connects the first transmit terminal TX1 and the second transmit terminal TX2 to the ground voltage GND through the $(1-1)^{th}$ to $(1-n)^{th}$ pull-down transistors MN0-1, MN0-2, . . . , and MN0-n and the second-1 to second-n pull-down transistors MN1-1, MN1-2, . . . , and MN1-n, respectively, thereby reducing the Q factor of the resonance unit 100.

As appreciated by the present inventors, when the transmit unit 280b concurrently turns on or off the $(1-1)^{th}$ to $(1-n)^{th}$ pull-down transistors MN0-1, MN0-2, . . . , and MN0-n and the second-1 to second-n pull-down transistors MN1-1, MN1-2, . . . , and MN1-n in the card mode, the magnitude of the voltage in the first power terminal L1 and the second power terminal L2 may sway in a moment so that the error may occur during the data communication unless otherwise addressed.

As described above, the transmit unit 280b sequentially turns on the $(1-1)^{th}$ to $(1-n)^{th}$ pull-down transistors MN0-1, MN0-2, . . . , and MN0-n and the second-1 to second-n pull-down transistors MN1-1, MN1-2, . . . , and MN1-n at the first time interval Td when the signal receive operation is performed in the card mode, and sequentially turns off the $(1-1)^{th}$ to $(1-n)^{th}$ pull-down transistors MN0-1, MN0-2, . . . , and MN0-n and the second-1 to second-n pull-down transistors MN1-1, MN1-2, . . . , and MN1-n at the first time interval Td when the signal transmit operation is performed in the card mode, thereby preventing the sway of the voltage in the first power terminal L1 and the second power terminal L2 when changing the Q factor of the resonance unit 100.

Figure 22:
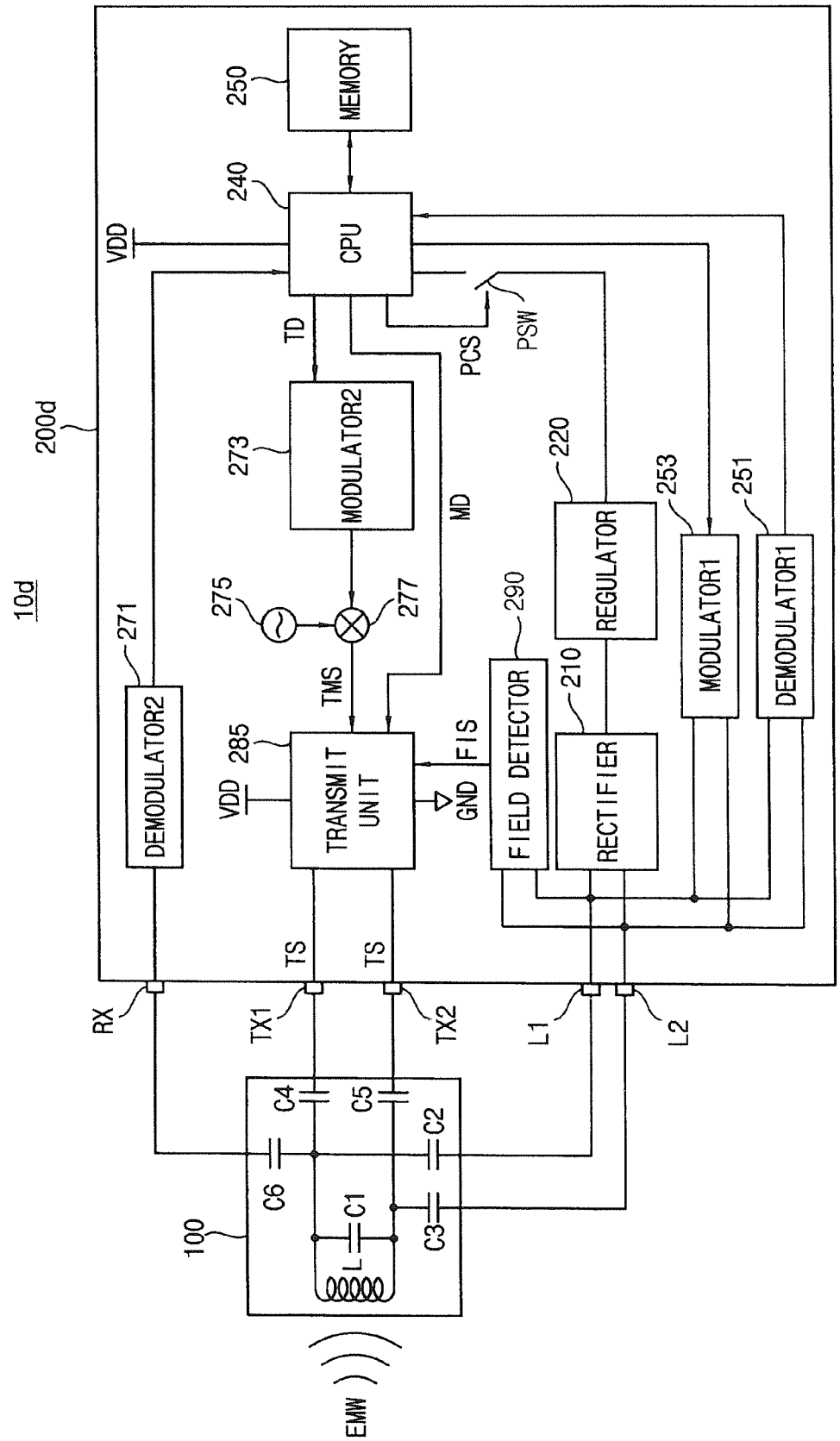
FIG. 22 is a block diagram illustrating an example of the NFC device of FIG. 1.

FIG. 22 is a block diagram illustrating an example of the NFC device of FIG. 1.

Elements used to operate the NFC device 10d in the reader mode as well as elements used to operate the NFC device 10d in the card mode are illustrated in FIG. 22.

Referring to FIG. 22, the NFC device 10d may include a resonance unit 100 and an NFC chip 200d.

The NFC device 10d of FIG. 22 is similar to the NFC device 10c of FIG. 18 except that the NFC device 10d of FIG. 22 further includes a field detector 290 and the transmit unit 280 is replaced with a transmit unit 285. Thus, in order to avoid redundancy, the following description will be made while focusing on the field detector 290 and the transmit unit 285 without explaining the elements illustrated in the NFC device 10c.

The field detector 290 may measure the voltage supplied from the resonance unit 100 through the first power terminal L1 and the second power terminal L2 to generate a field intensity signal FIS corresponding to the magnitude of the measured voltage. As the intensity of the EMW received from the external device becomes strong, the magnitude of the voltage supplied to the first power terminal L1 and the second power terminal L2 from the resonance unit 100 is increased, so the field intensity signal FIS may represent the intensity of EMW received from the external device.

The transmit unit 285 may be connected between the supply voltage VDD and the ground voltage GND.

The transmit unit 285 may determine whether the NFC chip 200d is in the card mode or the reader mode and may determine the signal receive operation or the signal transmit operation when the mode is the card mode based on the mode signal MD supplied from the CPU 240.

The transmit unit 285 may receive the transmit modulation signal TMS from the mixer 277 to generate the transmit signal TS corresponding to the transmit modulation signal TMS in the reader mode. The resonance unit 100 may generate the EMW corresponding to the transmit signal TS supplied from the transmit unit 285 through the first transmit terminal TX1 and the second transmit terminal TX2. For instance, in the reader mode, the transmit unit 285 may connect the first transmit terminal TX1 and the second transmit terminal TX2 to the supply voltage VDD through a pull-up load or connect the first transmit terminal TX1 and the second transmit terminal TX2 to the ground voltage GND through a pull-down load based on the transmit modulation signal TMS so that the transmit signal TS may be generated from the first transmit terminal TX1 and the second transmit terminal TX2.

The transmit unit 285 may reduce the Q factor of the resonance unit 100 when the signal receive operation is performed in the card mode and may maintain the Q factor of the resonance unit 100 when the signal transmit operation is performed in the card mode. For instance, the transmit unit 285 may reduce the Q factor of the resonance unit 100 when the signal receive operation is performed in the card mode by connecting the first transmit terminal TX1 and the second transmit terminal TX2 to the ground voltage GND through the pull-down load and may maintain the Q factor of the resonance unit 100 when the signal transmit operation is performed in the card mode by cutting off the first transmit terminal TX1 and the second transmit terminal TX2 from the ground voltage GND and the supply voltage VDD. In addition, the transmit unit 285 may control the reduction degree of the Q factor of the resonance unit 100 based on the field intensity signal FIS when the signal receive operation is performed in the card mode.

Figure 23:
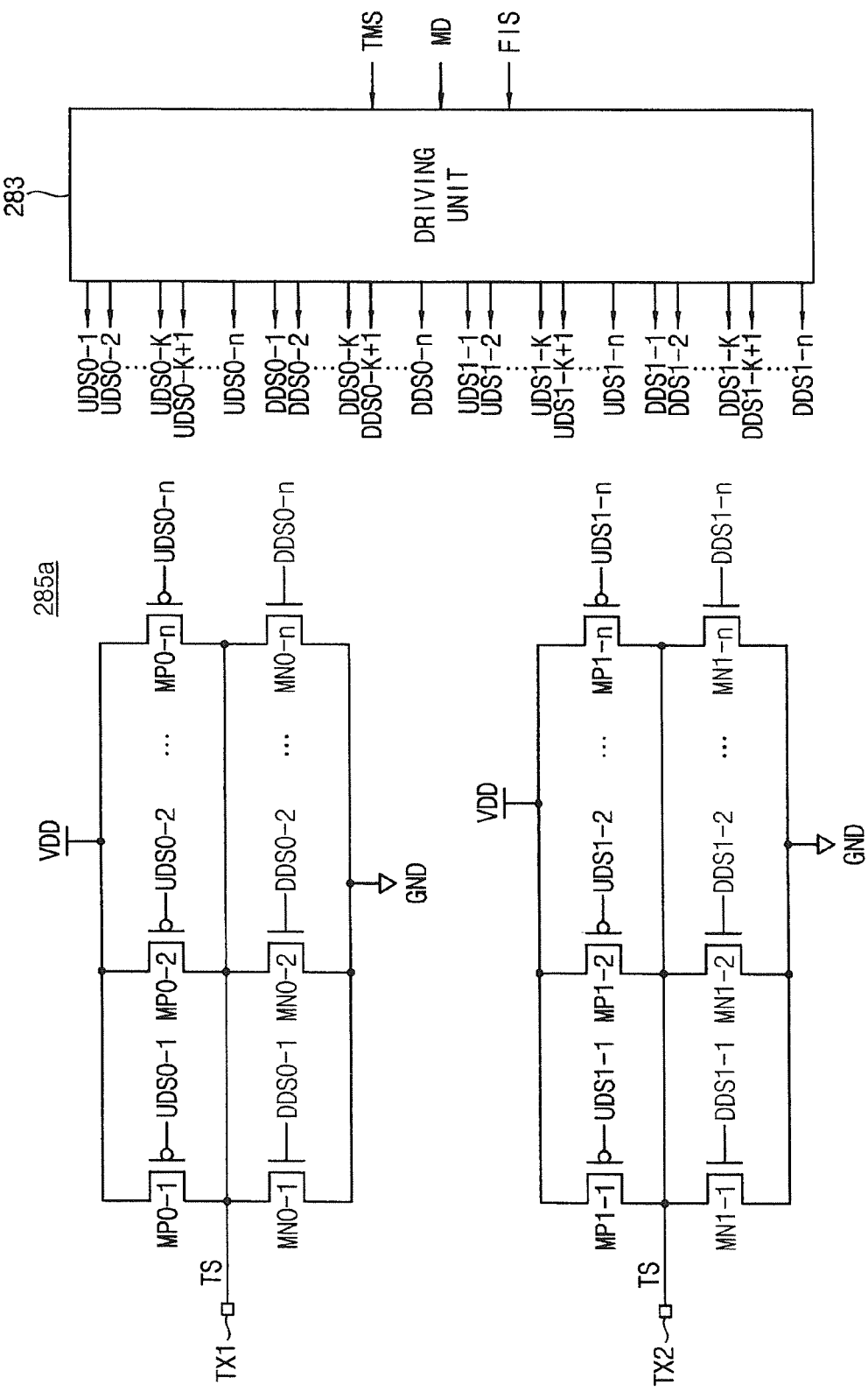
FIG. 23 is a block diagram illustrating an example of a transmit unit included in the NFC device of FIG. 22.

FIG. 23 is a block diagram illustrating an example of the transmit unit included in the NFC device of FIG. 22.

Referring to FIG. 23, the transmit unit 285a may include $(1-1)^{th}$ to $(1-n)^{th}$ pull-up transistors MP0-1, MP0-2, ..., and MP0-n, second-1 to second-n pull-up transistors MP1-1, MP1-2, ..., and MP1-n, $(1-1)^{th}$ to $(1-n)^{th}$ pull-down transistors MN0-1, MN0-2, ..., and MN0-n, second-1 to second-n pull-down transistors MN1-1, MN1-2, ..., and MN1-n, and a driving unit 283.

The $(1-1)^{th}$ to $(1-n)^{th}$ pull-up transistors MP0-1, MP0-2, ..., and MP0-n and the second-1 to second-n pull-up transistors MP1-1, MP1-2, ..., and MP1-n may be PMOS transistors, and the $(1-1)^{th}$ to $(1-n)^{th}$ pull-down transistors MN0-1, MN0-2, ..., and MN0-n and the second-1 to second-n pull-down transistors MN1-1, MN1-2, ..., and MN1-n may be the NMOS transistors.

The $(1-1)^{th}$ to $(1-n)^{th}$ pull-up transistors MP0-1, MP0-2, ..., and MP0-n may be connected in parallel between the supply voltage VDD and the first transmit terminal TX1, and the $(1-1)^{th}$ to $(1-n)^{th}$ pull-down transistors MN0-1, MN0-2, ..., and MN0-n may be connected in parallel between the first transmit terminal TX1 and the ground voltage GND.

The second-n pull-up transistors MP1-1, MP1-2, ..., and MP1-n may be connected in parallel between the supply voltage VDD and the second transmit terminal TX2 and the second-1 to second-n pull-down transistors MN1-1, MN1-2, ..., and MN1-n may be connected in parallel between the second transmit terminal TX2 and the ground voltage GND.

The driving unit 283 may drive the $(1-1)^{th}$ to $(1-n)^{th}$ pull-up transistors MP0-1, MP0-2, and MP0-n through $(1-1)^{th}$ to $(1-n)^{th}$ pull-up driving signals UDS0-1, UDS0-2, ..., and UDS0-n, respectively, drive the $(1-1)^{th}$ to (1-n)th pull-down transistors MN0-1, MN0-2, ..., and MN0-n through $(1-1)^{th}$ to $(1-n)^{th}$ pull-down driving signals DDS0-1, DDS0-2, ..., and DDS0-n, respectively, drive the second-n pull-up transistors MP1-1, MP1-2, ..., and MP1-n through second-1 to second-n pull-up driving signals UDS1-1, UDS1-2, ..., and UDS1-n, respectively, and drive the second-1 to second-n pull-down transistors MN1-1, MN1-2, ..., and MN1-n through second-1 to second-n pull-down driving signals DDS1-1, DDS1-2, ..., and DDS1-n, respectively.

The driving unit 283 may determine whether the NFC chip 200d is in the card mode or the reader mode and may determine the signal receive operation or the signal transmit operation when the mode is the card mode based on the mode signal MD supplied from the CPU 240.

In the reader mode, the driving unit 283 may turn on the $(1-1)^{th}$ to $(1-n)^{th}$ pull-up transistors MP0-1, MP0-2, ..., and MP0-n or the $(1-1)^{th}$ to $(1-n)^{th}$ pull-down transistors MN0-1, MN0-2, ..., and MN0-n and may turn on the second-n pull-up transistors MP1-1, MP1-2, ..., and MP1-n or the second-1 to second-n pull-down transistors MN1-1, MN1-2, ..., and MN1-n based on the transmit modulation signal TMS.

In the card mode, the driving unit 283 may select k pull-down transistors from among the $(1-1)^{th}$ to $(1-n)^{th}$ pull-down transistors MN0-1, MN0-2, ..., and MN0-n and the second-1 to second-n pull-down transistors MN1-1, MN1-2, ..., and MN1-n based on the field intensity signal FIS. For instance, the driving unit 283 may select the $(1-1)^{th}$ to $(1-k)^{th}$ pull-down transistors MN0-1, MN0-2, ..., and MN0-k and the second-1 to second-k pull-down transistors MN1-1, MN1-2, ..., and MN1-k, wherein k is a positive integer equal to or less than n.

In the card mode, the driving unit 283 generates the $(1-1)^{th}$ to $(1-n)^{th}$ pull-up driving signals UDS0-1, UDS0-2, ..., and UDS0-n and the second-1 to second-n pull-up driving signals UDS1-1, UDS1-2, ..., and UDS1-n having the logic high level, so the driving unit 283 can turn off the $(1-1)^{th}$ to $(1-n)^{th}$ pull-up transistors MP0-1, MP0-2, ..., and MP0-n and the second-1 to second-n pull-up transistors MP1-1, MP1-2, . . . , and MP1-$n$. In addition, as shown in FIG. 24, the driving unit 283 generates the $(1-(k+1))^{th}$ to $(1-n)^{th}$ pull-down driving signals DDS0-$(k+1)$, . . . , and DDS0-$n$ and the second-(k+1) to second-n pull-down driving signals DDS1-$(k+1)$, . . . , and DDS1-$n$ having the logic low level, so the driving unit 283 can turn off the $(1-(k+1))^{th}$ to $(1-n)^{th}$ pull-down transistors MN0-$(k+1)$, . . . , and MN0-$n$ and the second-(k+1) to second-n pull-down transistors MN1-$(k+1)$, . . . , and MN1-$n$, which are not selected.

Figure 24:
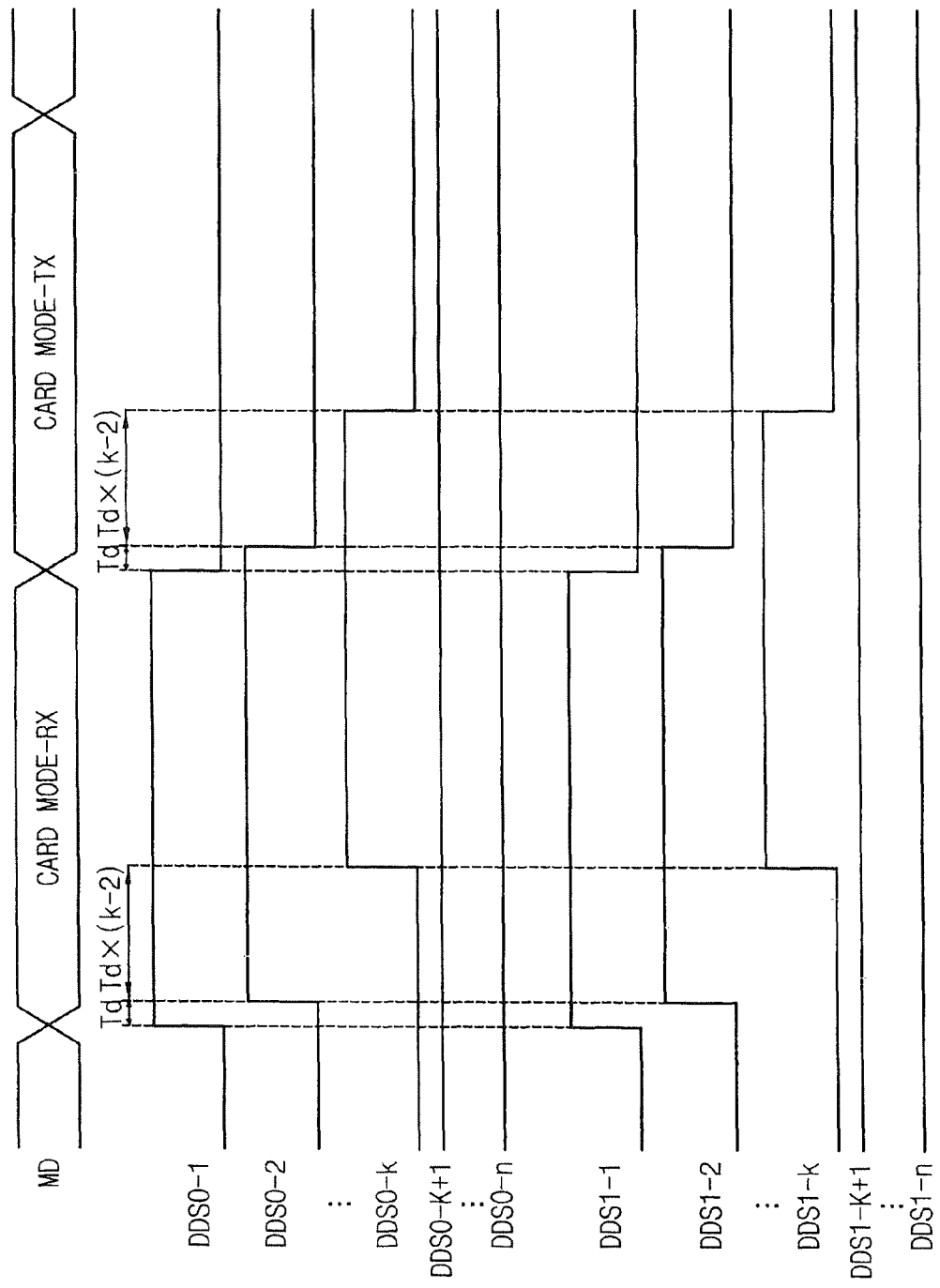
FIG. 24 is a view to explain the operation of a driving unit included in the transmit unit of FIG. 23.

In addition, as shown in FIG. 24, the driving unit 283 may sequentially turn on the $(1-1)^{th}$ to $(1-k)^{th}$ pull-down transistors MN0-1, MN0-2, . . . , and MN0-$k$ and the second-1 to second-k pull-down transistors MN1-1, MN1-2, . . . , and MN1-$k$ at the first time interval Td by sequentially enabling the $(1-1)^{th}$ to $(1-k)^{th}$ pull-down driving signals DDS0-1, DDS0-2, . . . , and DDS0-$k$ and the second-1 to second-k pull-down driving signals DDS1-1, DDS1-2, . . . , and DDS1-$k$ at the first time interval Td when the signal receive operation RX is performed in the card mode.

Further, as shown in FIG. 24, the driving unit 283 may sequentially turn off the $(1-1)^{th}$ to $(1-k)^{th}$ pull-down transistors MN0-1, MN0-2, . . . , and MN0-$k$ and the second-1 to second-k pull-down transistors MN1-1, MN1-2, . . . , and MN1-$k$ at the first time interval Td by sequentially disabling the $(1-1)^{th}$ to $(1-k)^{th}$ pull-down driving signals DDS0-1, DDS0-2, . . . , and DDS0-$k$ and the second-1 to second-k pull-down driving signals DDS1-1, DDS1-2, . . . , and DDS1-$k$ at the first time interval Td when the signal transmit operation TX is performed in the card mode.

As described above, the transmit unit 285$a$ drives the $(1-1)^{th}$ to $(1-n)^{th}$ pull-up transistors MP0-1, MP0-2, . . . , and MP0-$n$, the second-n pull-up transistors MP1-1, MP1-2, . . . , and MP1-$n$, the $(1-1)^{th}$ to $(1-n)^{th}$ pull-down transistors MN0-i, MN0-2, . . . , and MN0-$n$ and the second-1 to second-n pull-down transistors MN1-1, MN1-2, . . . , and MN1-$n$ based on the transmit modulation signal TMS in the reader mode to perform the normal operation to provide the transmit signal TS to the resonance unit 100. In addition, when the signal receive operation is performed in the card mode, the transmit unit 285$a$ connects the first transmit terminal TX1 and the second transmit terminal TX2 to the ground voltage GND through the $(1-1)^{th}$ to $(1-k)^{th}$ pull-down transistors MN0-1, MN0-2, . . . , and MN0-$k$ and the second-1 to second-k pull-down transistors MN1-1, MN1-2, . . . , and MN1-$k$, respectively, thereby reducing the Q factor of the resonance unit 100. In addition, the transmit unit 285$a$ may control the reduction degree of the Q factor of the resonance unit 100 by adjusting the number (k) of pull-down transistors to be turned on when the signal receive operation is performed in the card mode based on the field intensity signal FIS.

As appreciated by the present inventors, when the transmit unit 285$a$ concurrently turns on or off the $(1-1)^{th}$ to $(1-k)^{th}$ pull-down transistors MN0-1, MN0-2, . . . , and MN0-$k$ and the second-1 to second-k pull-down transistors MN1-1, MN1-2, . . . , and MN1-$k$ in the card mode, the magnitude of the voltage in the first power terminal L1 and the second power terminal L2 may sway in a moment so that the error may occur during the data communication unless otherwise addressed.

As described above, the transmit unit 285$a$ sequentially turns on the $(1-1)^{th}$ to $(1-k)^{th}$ pull-down transistors MN0-1, MN0-2, . . . , and MN0-$k$ and the second-1 to second-k pull-down transistors MN1-1, MN1-2, . . . , and MN1-$k$ at the first time interval Td when the signal receive operation is performed in the card mode, and sequentially turns off the $(1-1)^{th}$ to $(1-k)^{th}$ pull-down transistors MN0-1, MN0-2, . . . , and MN0-$k$ and the second-1 to second-k pull-down transistors MN1-1, MN1-2, . . . , and MN1-$k$ at the first time interval Td when the signal transmit operation is performed in the card mode, thereby preventing the sway of the voltage in the first power terminal L1 and the second power terminal L2 when changing the Q factor of the resonance unit 100.

Figure 25:
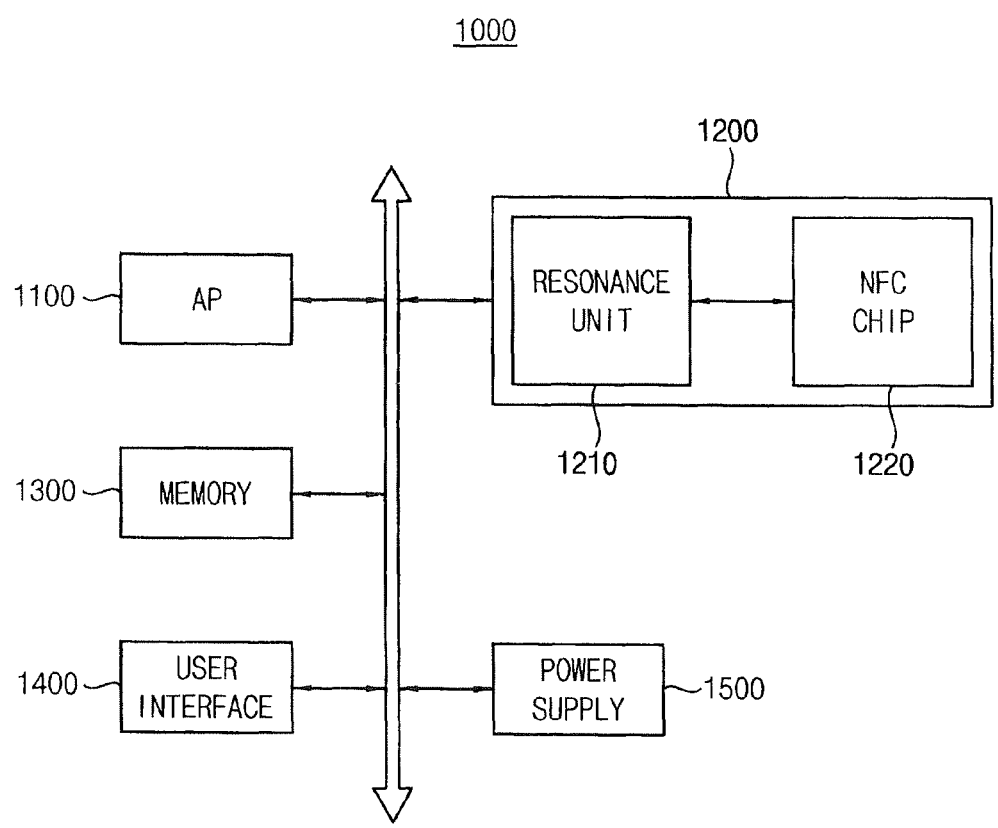
FIG. 25 is a block diagram illustrating an electronic system according to example embodiments.

FIG. 25 is a block diagram illustrating an electronic system according to example embodiments.

Referring to FIG. 25, an electronic system 1000 includes an application processor AP 1100, an NFC (near field communication) device 1200, a memory device 1300, a user interface 1400 and a power supply 1500. In some embodiments, the electronic system 1000 may be a mobile phone, a smart phone, a personal digital assistant (PDA), a portable multimedia player (PMP), a digital camera, a music player, a portable game console, a navigation system, a laptop computer, etc.

The application processor 1100 may control overall operations of the electronic system 1000. The application processor 1100 may execute applications, such as a web browser, a game application, a video player, etc. In some embodiments, the application processor 1100 may include a single core or multiple cores. For example, the application processor 1100 may be a multi-core processor, such as a dual-core processor, a quad-core processor, a hexa-core processor, etc. The application processor 1100 may include an internal or external cache memory.

The memory device 1300 may store data used to operate the electronic system 1000. For example, the memory device 1300 may store a boot image for booting the electronic system 1000, data to be output to an external device and input data received from the external device. For example, the memory device 1300 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The NFC device 1200 may provide the data stored in the memory device 1300 to the external device through NFC and store the input data received from the external device through NFC into the memory device 1300. The NFC device 1200 may include a resonance unit 1210 and an NFC chip 1220. The resonance unit 1210 may provide data communication with the external device through an electromagnetic wave. The NFC chip 1220 may provide the output data to the resonance unit 1210, receive the input data from the resonance unit 1210, reduce a Q factor (quality factor) of the resonance unit 1210 when a signal receive operation is performed in a card mode, and maintain the Q factor of the resonance unit 1210 in a reader mode and when a signal transmit operation is performed in the card mode. The NFC device 1200 may be embodied with the NFC device 10 of FIG. 1. A structure and an operation of the NFC device 10 are described with reference to FIGS. 1 to 24.

The user interface 1400 may include at least one input device, such as a keypad, a touch screen, etc., and at least one output device, such as a speaker, a display device, etc. The power supply 1500 may supply a power supply voltage to the electronic system 1000.

In some embodiments, the electronic system 1000 may further include an image processor, and/or a storage device, such as a memory card, a solid state drive (SSD), a hard disk drive (HDD), a CD-ROM, etc.

In some embodiments, the electronic system 1000 and/or components of the electronic system 1000 may be packaged in various foams, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

The foregoing is illustrative of the present inventive concept and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A Near Field Communication (NFC) device comprising:
    a resonance circuit configured to generate a first voltage in response to an electromagnetic wave; and
    an NFC chip configured to provide output data to the resonance circuit, to receive input data from the resonance circuit, to operate the resonance circuit with a first quality factor (Q factor) in response to a first mode signal, and to operate the resonance circuit with a second Q factor in response to a second mode signal,
    wherein the first mode signal is provided in a reader mode,
    the first mode signal is provided when a signal transmit operation is performed in a card mode,
    the second mode signal is provided when a signal receive operation is performed in the card mode, and
    the first Q factor is greater than the second Q factor.

2. The NFC device of claim 1, wherein the NFC chip:
    connects a terminal connected to the resonance circuit to a ground voltage through a pull-down load when the signal receive operation is performed in the card mode;
    cuts off the terminal connected to the resonance circuit from the ground voltage in the reader mode; and
    cuts off the terminal connected to the resonance circuit from the ground voltage when the signal transmit operation is performed in the card mode.

3. The NFC device of claim 1, wherein the NFC chip measures a second voltage supplied from the resonance circuit and controls a reduction degree of the first Q factor or the second Q factor, based on a magnitude of the second voltage, when the signal receive operation is performed in the card mode.

4. The NFC device of claim 1, wherein the NFC chip comprises a central processing unit (CPU) configured to generate the first mode signal or the second mode signal.

5. The NFC device of claim 4, wherein the NFC chip comprises a transmit circuit configured to change or maintain the first Q factor or the second Q factor, based on the first mode signal and/or the second mode signal.

6. The NFC device of claim 5, wherein the transmit circuit connects between a supply voltage and a ground voltage, and includes at least one transistor.

7. The NFC device of claim 1, wherein the NFC chip comprises a Q factor sink circuit which is connected a ground voltage, and which changes or maintains the first Q factor or the second Q factor based on the first mode signal and/or the second mode signal.

8. The NFC device of claim 7, further comprising a field detector configured to receive the first voltage and to generate a field intensity signal corresponding to a magnitude of the first voltage,
    wherein the Q factor sink circuit controls a reduction degree of the first Q factor or the second Q factor based on the field intensity signal when the signal receive operation is performed in the card mode.

9. An NFC device comprising:
    a resonance circuit configured to generate a first voltage in response to an electromagnetic wave; and
    an NFC chip configured to provide output data to the resonance circuit, to receive input data from the resonance circuit, to change a Q factor of the resonance circuit when a signal receive operation is performed in a card mode, to maintain the Q factor of the resonance circuit in a reader mode, and to maintain the Q factor of the resonance circuit when a signal transmit operation is performed in the card mode.

10. The NFC device of claim 9, wherein the NFC chip operates:
    the resonance circuit with a first Q factor in response to a first mode signal; and
    the resonance circuit with a second Q factor in response to a second mode signal, and
    the first Q factor is greater than the second Q factor.

11. The NFC device of claim 10, wherein:
    the first mode signal is provided in the reader mode;
    the first mode signal is provided when the signal transmit operation is performed in the card mode; and
    the second mode signal is provided when the signal receive operation is performed in the card mode.

12. The NFC device of claim 9, wherein the NFC chip maintains the Q factor when the signal transmit operation is performed in the card mode by cutting off a terminal connected to the resonance circuit from a ground voltage.

13. The NFC device of claim 9, wherein the NFC chip reduces the Q factor when the signal receive operation is performed in the card mode.

14. The NFC device of claim 9, wherein, in the card mode for the signal transmit operation, the NFC chip provides a modulation signal to the resonance circuit.

15. The NFC device of claim 9, wherein, in the reader mode, the NFC chip provides a transmit signal to the resonance circuit.

16. An NFC device comprising:
    a resonance circuit configured to generate a first voltage in response to an electromagnetic wave; and
    an NFC chip comprising:
        a central processing unit (CPU) configured to generate a mode signal that represents a card mode or a reader mode; and
        a transmit circuit configured to determine a Q factor of the resonance circuit based on the mode signal,
    wherein the mode signal represents a signal receive operation or a signal transmit operation when the mode signal represents the card mode, and wherein the NFC chip:
  changes the Q factor of the resonance circuit when the signal receive operation is performed in the card mode;
  maintains the Q factor of the resonance circuit in the reader mode; and
  maintains the Q factor of the resonance circuit when the signal transmit operation is performed in the card mode.

17. The NFC device of claim 16, wherein the NFC chip provides output data to the resonance circuit and receives input data from the resonance circuit.

18. The NFC device of claim 16, wherein the NFC chip comprises:
  a rectifier configured to generate a second voltage by rectifying the first voltage;
  a regulator configured to generate an internal voltage by using the second voltage; and
  a Q factor sink circuit configured to selectively reduce the Q factor of the resonance circuit based on the mode signal.

19. The NFC device of claim 16, wherein the NFC chip receives the first voltage from the resonance circuit through a first power terminal and a second power terminal.

20. The NFC device of claim 16, wherein the NFC chip reduces the Q factor when the signal receive operation is performed in the card mode by connecting a terminal connected to the resonance circuit to a ground voltage through a pull-down load.

* * * * *